(12) United States Patent
Patnaik et al.

(10) Patent No.: US 12,728,839 B2
(45) **Date of Patent: *Sep. 8, 2026**

(54) METHOD FOR PERFORMING A VEHICLE ASSIST OPERATION

(71) Applicant: Waymo LLC, Mountain View, CA (US)

(72) Inventors: Vijaysai Patnaik, San Francisco, CA (US); William Grossman, East Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 18/964,856

(22) Filed: Dec. 2, 2024

(65) Prior Publication Data

US 2025/0093871 A1 Mar. 20, 2025

Related U.S. Application Data

(63) Continuation of application No. 17/839,640, filed on Jun. 14, 2022, now Pat. No. 12,204,332, which is a (Continued)

(51) Int. Cl.

*B60W 30/06* (2006.01)
*B62D 15/02* (2006.01)

(Continued)

(52) U.S. Cl.

CPC ......... *B60W 30/06* (2013.01); *B62D 15/0285* (2013.01); *G05D 1/0231* (2013.01);

(Continued)

(58) Field of Classification Search

CPC .. G05D 1/0088; G05D 1/0214; G05D 1/0231; G05D 1/0295; G05D 1/249;

(Continued)

(56) References Cited

U.S. PATENT DOCUMENTS 2,879,350 A 3/1959 Andrew
4,184,655 A 1/1980 Anderberg (Continued)

FOREIGN PATENT DOCUMENTS

CN 107850895 A 3/2018
CN 109941282 A 6/2019

(Continued)

OTHER PUBLICATIONS

Chinese Office Action for Application No. CN20208006795.9 dated Jun. 29, 2023.

(Continued)

*Primary Examiner* — Frederick M Brushaber

(74) *Attorney, Agent, or Firm* — Botos Churchill IP Law LLP

(57) ABSTRACT

The technology relates to assisting large self-driving vehicles, such as cargo vehicles, as they maneuver towards and/or park at a destination facility. This may include a given vehicle transitioning between different autonomous driving modes. Such a vehicles may be permitted to drive in a fully autonomous mode on certain roadways for the majority of a trip, but may need to change to a partially autonomous mode on other roadways or when entering or leaving a destination facility such as a warehouse, depot or service center. Large vehicles such as cargo truck may have limited room to maneuver in and park at the destination, which may also prevent operation in a fully autonomous mode. Here, information from the destination facility and/or a remote assistance service can be employed to aid in real-time semi-autonomous maneuvering.

20 Claims, 23 Drawing Sheets

Related U.S. Application Data continuation of application No. 16/548,980, filed on Aug. 23, 2019, now Pat. No. 11,392,122.

(60) Provisional application No. 62/879,571, filed on Jul. 29, 2019.

(51) Int. Cl.

| | |
|---|---|
| ***G05D 1/00*** | (2024.01) |
| ***G05D 1/249*** | (2024.01) |
| ***G06V 20/58*** | (2022.01) |
| ***G08G 1/0967*** | (2006.01) |
| ***G08G 1/14*** | (2006.01) |
| *G08G 1/00* | (2006.01) |

(52) U.S. Cl.

CPC .......... *G05D 1/249* (2024.01); *G06V 20/584* (2022.01); *G08G 1/096725* (2013.01); *G08G 1/096791* (2013.01); *G08G 1/146* (2013.01); *B60W 2554/00* (2020.02); *G08G 1/22* (2013.01)

(58) Field of Classification Search

CPC .......... G05D 1/617; G05D 1/695; G05D 1/81; B60W 30/06; B60W 2554/00; B60W 2556/45; B60W 2556/50; B60W 2556/65; B60W 10/20; B60W 30/165; B60W 60/001; G06V 20/584; G08G 1/096725; G08G 1/096791; G08G 1/22; G08G 1/143; G08G 1/146; H04W 4/46; H04W 12/06; H04W 12/77; B62D 15/026; B62D 15/0285

See application file for complete search history.

(56) References Cited

U.S. PATENT DOCUMENTS

| | | | | |
|---|---|---|---|---|
| 8,963,704 | B2 | 2/2015 | Adami | |
| 9,079,587 | B1 | 7/2015 | Rupp et al. | |
| 9,486,921 | B1 | 11/2016 | Straszheim et al. | |
| 9,581,997 | B1 * | 2/2017 | Penilla | G01C 21/3469 |
| 9,582,006 | B2 | 2/2017 | Switkes et al. | |
| 9,720,410 | B2 | 8/2017 | Fairfield et al. | |
| 9,830,825 | B2 | 11/2017 | Anstett | |
| 10,078,338 | B2 | 9/2018 | Smartt et al. | |
| 10,310,087 | B2 | 6/2019 | Laddha et al. | |
| 10,339,815 | B1 | 7/2019 | Sin | |
| 10,948,927 | B1 | 3/2021 | Harris et al. | |
| 11,004,344 | B2 | 5/2021 | Bergquist et al. | |
| 11,010,907 | B1 * | 5/2021 | Bagwell | G05D 1/0221 |
| 11,011,064 | B2 | 5/2021 | Zhou et al. | |
| 12,518,582 | B2 * | 1/2026 | Skaaksrud | G06Q 10/083 |
| 2006/0179671 | A1 | 8/2006 | Ghatak | |
| 2007/0233337 | A1 | 10/2007 | Plishner | |
| 2010/0256852 | A1 | 10/2010 | Mudalige | |
| 2015/0088373 | A1 | 3/2015 | Wilkins | |
| 2015/0203156 | A1 * | 7/2015 | Hafner | G08G 1/143 701/36 |
| 2015/0370255 | A1 * | 12/2015 | Harvey | G05D 1/0287 701/24 |
| 2016/0071418 | A1 | 3/2016 | Oshida et al. | |
| 2016/0223350 | A1 * | 8/2016 | Lewis | G01C 21/3407 |
| 2016/0318510 | A1 | 11/2016 | Hess | |
| 2017/0003687 | A1 * | 1/2017 | Kojo | B60N 2/002 |
| 2017/0090480 | A1 | 3/2017 | Ho et al. | |
| 2017/0168503 | A1 | 6/2017 | Amla et al. | |
| 2017/0212511 | A1 * | 7/2017 | Paiva Ferreira | G08G 1/22 |
| 2017/0313306 | A1 * | 11/2017 | Nordbruch | B60W 30/06 |
| 2017/0341516 | A1 | 11/2017 | Brooks et al. | |
| 2017/0344023 | A1 | 11/2017 | Laubinger et al. | |
| 2018/0113477 | A1 | 4/2018 | Rodriguez et al. | |
| 2018/0137454 | A1 * | 5/2018 | Kulkarni | G06Q 10/083 |
| 2019/0019407 | A1 | 1/2019 | Nakhjavani | |
| 2019/0094858 | A1 | 3/2019 | Radosavljevic et al. | |
| 2019/0138024 | A1 | 5/2019 | Liang et al. | |
| 2019/0147320 | A1 | 5/2019 | Mattyus et al. | |
| 2019/0204853 | A1 | 7/2019 | Miller et al. | |
| 2019/0206262 | A1 | 7/2019 | Sin | |
| 2019/0213889 | A1 | 7/2019 | Calleja Alvarez et al. | |
| 2019/0235506 | A1 | 8/2019 | Bardapurkar et al. | |
| 2019/0286921 | A1 | 9/2019 | Liang et al. | |
| 2019/0287062 | A1 * | 9/2019 | Skaaksrud | G06Q 10/083 |
| 2019/0306680 | A1 | 10/2019 | Doggart et al. | |
| 2019/0310651 | A1 | 10/2019 | Vallespi-Gonzalez et al. | |
| 2020/0001863 | A1 * | 1/2020 | Li | B60W 30/06 |
| 2020/0057453 | A1 | 2/2020 | Laws et al. | |
| 2020/0183383 | A1 * | 6/2020 | Stent | G05D 1/0061 |
| 2020/0290482 | A1 | 9/2020 | Jones | |
| 2020/0341472 | A1 | 10/2020 | Zenner et al. | |
| 2020/0393847 | A1 | 12/2020 | Govindan et al. | |
| 2021/0163021 | A1 | 6/2021 | Frazzoli et al. | |
| 2021/0323537 | A1 * | 10/2021 | Fan | H04N 7/18 |
| 2021/0398432 | A1 | 12/2021 | Bae et al. | |

FOREIGN PATENT DOCUMENTS

| | | | |
|---|---|---|---|
| JP | 2019046034 | A | 3/2019 |
| KR | 101102408 | B1 | 1/2012 |
| WO | 2004077378 | A1 | 9/2004 |
| WO | 2018004542 | A1 | 1/2018 |
| WO | 2018147041 | A1 | 8/2018 |

OTHER PUBLICATIONS

City of Waco, Texas, Parking and Access Design Standards for Site Development, From the Waco Development Guide, Revised Jan. 2010, pp. 1-25.

Dock Planning Standards, www.novalocks.com, 2013 Nova Technology International, pp. 1-30.

Dock System Guide Planning and Designs, www.BlueGiant.com, Jul. 4, 2008, pp. 1-38.

International Search Report and Written Opinion for Application No. PCT/US2020/041927 dated Oct. 23, 2020.

Mora, et al, Management and Transport Automation in Warehouses Based on Auto-Guided Vehicles, Department of Systems Engineering and Control Technical University of Valencia, Spain, 2006, pp. 1-6.

Neuweiler, et al, Autonomous Driving in the Logistics Industry, A multi-perspective view on self-driving trucks, changes in competitive advantages and their implications, Jönköping University, International Business School, May 2017, pp. 1-96.

Peloton Announces its Vision for the Trucking Industry: Drivers Lead, and Technology Follows, https://peloton-tech.com/peloton-announces-its-vision-for-the-trucking-industry-drivers-lead-and-technology-follows/, copyright 2018 Peloton Technology, pp. 1-2.

Shankwitz, Long-haul Truck Freight, Transport and the Role of Automation: Collaborative Human—Automated Platooned Trucks Alliance, Western Transportation Institute Montana State University, Apr. 11, 2017, pp. 1-14.

The Extended European Search Report for European Patent Application No. 20846500.5, May 30, 2023, 9 Pages.

* cited by examiner 100
102
104
106
108
109
110
112
114

102
104

160
158a
158b
152
156a
156b
154
150

200
202
Computing Device(s)
204
Processor(s)
206
Memory
208
Instructions
210
Data
224
Perception System
232
Sensor assemblies
Deceleration System
212
Acceleration System
214
Steering System
216
Signaling System
218
Navigation System
220
Positioning System
222
Power System (Engine)
226
Wheels / Tires
228
Transmission System
230
Communication System
234
Coupling System to Trailer
236

240
ECU
242
Processor(s)
244
Memory
246
Instructions
248
Data
250
Perception System
258
Sensor assemblies
264
Deceleration System
252
Signaling System
254
Positioning System (sensors)
256
Power System (Batteries)
260
Wheels / Tires
262
Landing Gear
266
Coupling System
268
Connection Section
270
Kingpin
272

300
302
Computing Device(s)
304
Processor(s)
306
Memory
308
Instructions
310
Data
334
User Interface
336
User Input
338
Display(s)
340
Speakers
324
Perception System
332
Sensor(s)
Deceleration System
312
Acceleration System
314
Steering System
316
Signaling System
318
Navigation System
320
Positioning System
322
Power System (Engine)
326
Wheels / Tires
328
Transmission System
330
Communication System
342

500

604
606
602
600

610

700

710

720

730

810

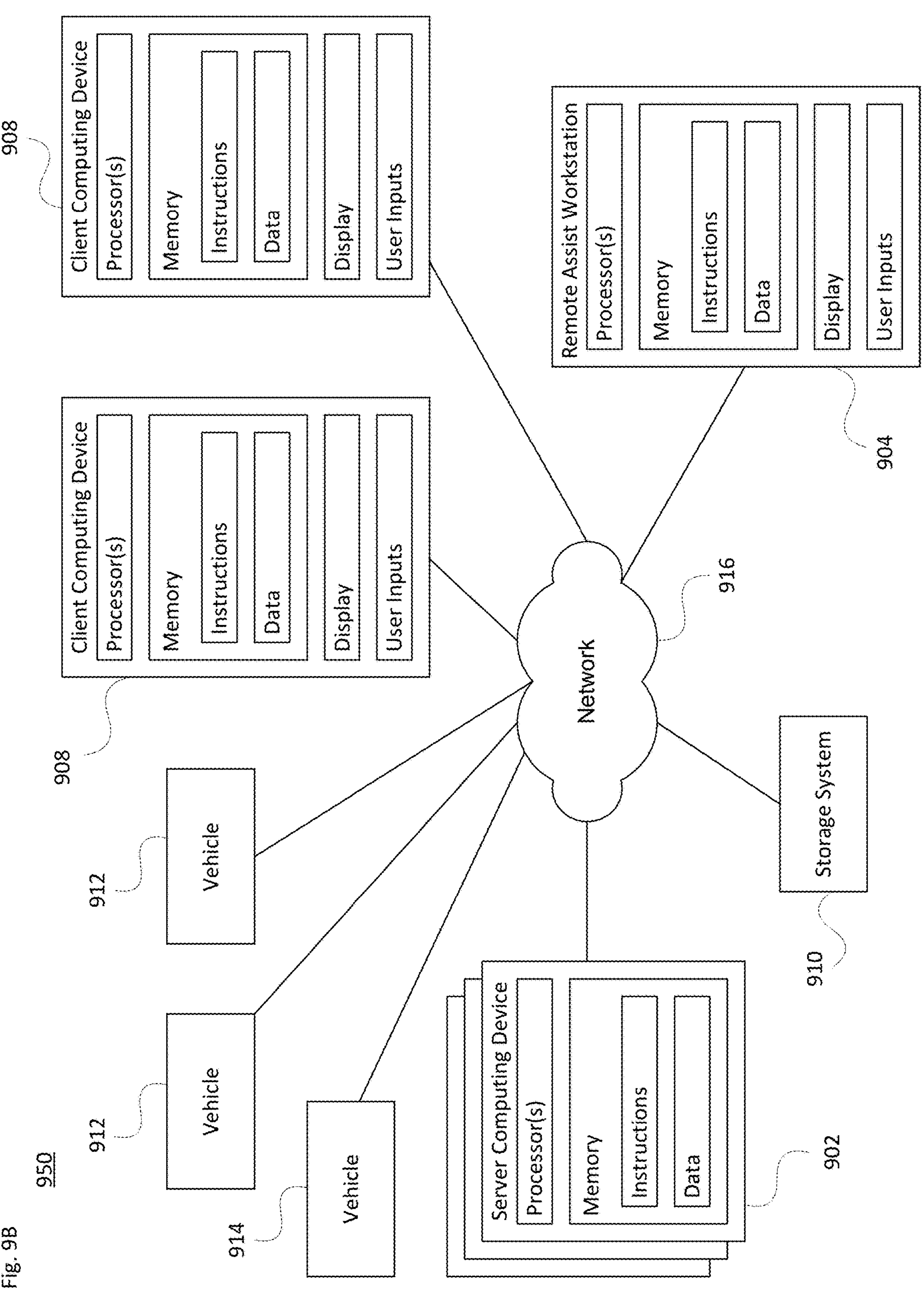
Fig. 9B
950
Client Computing Device
Processor(s)
Memory
Instructions
Data
Display
User Inputs
908
Client Computing Device
Processor(s)
Memory
Instructions
Data
Display
User Inputs
908
Remote Assist Workstation
Processor(s)
Memory
Instructions
Data
Display
User Inputs
904
Network
916
Vehicle
912
Vehicle
912
Vehicle
914
Storage System
910
Server Computing Device
Processor(s)
Memory
Instructions
Data
902

1000

1050

1100

METHOD FOR PERFORMING A VEHICLE ASSIST OPERATION

CROSS-REFERENCE TO RELATED APPLICATIONS

The present application is a continuation of U.S. patent application Ser. No. 17/839,640, filed Jun. 14, 2022, which is a continuation of U.S. patent application Ser. No. 16/548,980 filed Aug. 23, 2019 and issued as U.S. Pat. No. 11,392,122 on Jul. 19, 2022, which claims the benefit of the filing date of U.S. Provisional Application No. 62/879,571, filed Jul. 29, 2019, the entire disclosures of which are incorporated herein by reference. This application is related to U.S. application Ser. No. 16/548,960, entitled Methods for Transitioning Between Autonomous Driving Modes in Large Vehicles, filed Aug. 23, 2019 and issued as U.S. Pat. No. 11,927,955 on Mar. 12, 2024, the entire disclosure of which is incorporated herein by reference.

BACKGROUND

Autonomous vehicles, such as vehicles that do not require a human driver, can be used to aid in the transport of trailered (e.g., towed) cargo, such as consumer goods, equipment, livestock or other items from one location to another. Such vehicles may operate in a fully autonomous mode or a partially autonomous mode where a person may provide some driving input. There may be situations where a cargo truck or other large vehicle is permitted to operate fully autonomously for part of a route, such as a freeway, but is not permitted to operate in that mode for another part of the route, such as surface streets near a warehouse or depot. In addition, once the vehicle arrives at the warehouse or depot, tight maneuvering may be required with limited sight lines. Many vehicles may not be equipped with sensors sufficient to enable them to reverse or otherwise maneuver into a warehouse dock or other parking location in an autonomous driving mode. In such situations, changing driving modes and potentially having to bring in a human driver could introduce significant logistical complexities for getting the cargo to its destination timely and effectively.

BRIEF SUMMARY

The technology relates to maneuvering self-driving cargo trucks and other vehicles from main thoroughfares (e.g., freeways) to warehouses, service centers, delivery locations and other facilities. One aspect involves situations where the vehicle is not cleared or otherwise permitted to operate fully autonomously on surface streets. Here, a truck may transition from purely autonomously driving (e.g., level 5 autonomy) to an autonomous "follow" mode, in which the truck drives behind a lead vehicle while performing mimicking or similar driving operations as the lead vehicle. Another aspect involves how the self-driving vehicle maneuvers and parks at a depot or other destination, without requiring the vehicle to have sensors installed on the trailer(s) or other parts of the vehicle. Both of these aspects are discussed in detail below.

According to one aspect of the technology, a method of performing a vehicle assist operation for an autonomous cargo vehicle is provided. The method comprises receiving sensor information from a perception system of the autonomous cargo vehicle; selecting a parking location for the autonomous cargo vehicle at a parking facility; receiving a live feed of imagery from one or more sensors of the parking facility; obtaining a roadgraph of the parking facility, the road graph providing a path for the autonomous cargo vehicle to arrive at the selected parking location; and using the roadgraph and live feed of imagery to assist a driving system of the autonomous cargo vehicle to drive to the selected parking location in an autonomous driving mode.

In one example the method further comprises generating an augmented trajectory based on the live feed of imagery, the augmented trajectory supplementing the roadgraph; and providing the augmented trajectory to the driving system in real time to enable the driving system to drive to the selected parking location in an autonomous driving mode.

In another example, the roadgraph includes a set of paths for backing the autonomous cargo vehicle into the selected parking location.

In a further example, the method also includes detecting an obstruction at the parking facility between the autonomous cargo vehicle and the selected parking location; and modifying the roadgraph with an augmented trajectory to avoid the obstruction.

In yet another example, the method further comprises performing a perception analysis on the live feed of images to detect one or more objects in an apron space of the parking facility. The perception analysis may include categorizing the detected one or more objects. In this case, the method may further include instructing the driving system of the autonomous cargo vehicle to take a corrective action in response to categorization of at least one of the detected objects. The corrective action may be either stopping or repositioning the autonomous cargo vehicle until the at least one categorized object has moved away from a given location at the parking facility.

In a further example, the parking facility is a warehouse, depot, service center or delivery location.

According to another aspect of the technology, a system is configured to perform a vehicle assist operation for an autonomous cargo vehicle. The system comprises memory storing a set of roadgraphs of a parking facility, and one or more processors operatively coupled to the memory. The one or more processors are configured to receive sensor information from a perception system of the autonomous cargo vehicle, select a parking location for the autonomous cargo vehicle at the parking facility, and receive a live feed of imagery from one or more sensors of the parking facility. The one or more processors are also configured to select one of the roadgraphs from the set of roadgraphs of the parking facility. The selected roadgraph provides a path for the autonomous cargo vehicle to arrive at the selected parking location. The one or more processors are further configured to use the selected roadgraph and live feed of imagery to assist a driving system of the autonomous cargo vehicle to drive to the selected parking location in an autonomous driving mode.

In one example, the one or more processors are further configured to generate an augmented trajectory based on the live feed of imagery. The augmented trajectory supplements the selected roadgraph. Here, the one or more processors also provide the augmented trajectory to the driving system in real time to enable the driving system to drive to the selected parking location in an autonomous driving mode.

In another example, the set of roadgraph includes a set of paths for backing the autonomous cargo vehicle into the selected parking location.

In a further example, the one or more processors are further configured to detect an obstruction at the parking facility between the autonomous cargo vehicle and the selected parking location, and modify the selected roadgraph with an augmented trajectory to avoid the obstruction.

In yet another example, the one or more processors are further configured to perform a perception analysis on the live feed of images to detect one or more objects in an apron space of the parking facility. Here, the perception analysis may include categorization of the detected one or more objects. In this case, the one or more processors may be further configured to instruct the driving system of the autonomous cargo vehicle to take a corrective action in response to categorization of at least one of the detected objects. The corrective action may include either stopping or repositioning the autonomous cargo vehicle until the at least one categorized object has moved away from a given location at the parking facility.

In a further example, the parking facility is a warehouse, depot, service center or delivery location. The system may also include the one or more sensors of the parking facility And according to another aspects of the technology, a non-transitory computer-readable recording medium is provided having instructions stored thereon. The instructions, when executed by one or more processors, cause the one or more processors to perform a vehicle assist operation for an autonomous cargo vehicle. The vehicle assist operation includes: receiving sensor information from a perception system of the autonomous cargo vehicle; selecting a parking location for the autonomous cargo vehicle at a parking facility; receiving a live feed of imagery from one or more sensors of the parking facility; obtaining a roadgraph of the parking facility, the roadgraph providing a path for the autonomous cargo vehicle to arrive at the selected parking location; and using the roadgraph and live feed of imagery to assist a driving system of the autonomous cargo vehicle to drive to the selected parking location in an autonomous driving mode.

BRIEF DESCRIPTION OF THE DRAWINGS

FIGS. 9A-B illustrate an example system in accordance with aspects of the disclosure.

DETAILED DESCRIPTION

The technology involves maneuvering self-driving vehicles to destinations in situations that require transitioning between different autonomous driving modes. Cargo trucks or other large vehicles may be able to drive fully autonomously on highways for the majority of a trip, but local regulations, road configurations or other factors may not permit this driving mode on surface streets or when entering or leaving a warehouse, depot or other destinations. Similarly, such vehicles may not easily be able to maneuver in and park at the destination in a fully autonomous mode using just onboard sensors.

In order to address these situations, one aspect includes transitioning the vehicle from purely autonomously driving (e.g., level 5 autonomy) to an autonomous "follow" mode, in which the self-driving vehicle drives behind a lead vehicle while performing mimicking or similar driving operations as the lead vehicle. A second aspect involves supporting the self-driving vehicle to maneuver and park at a depot or other facility without requiring the vehicle to have sensors installed on the trailer(s) or other portions of the vehicle.

Example Vehicle Systems

Figures 1A, 1B:
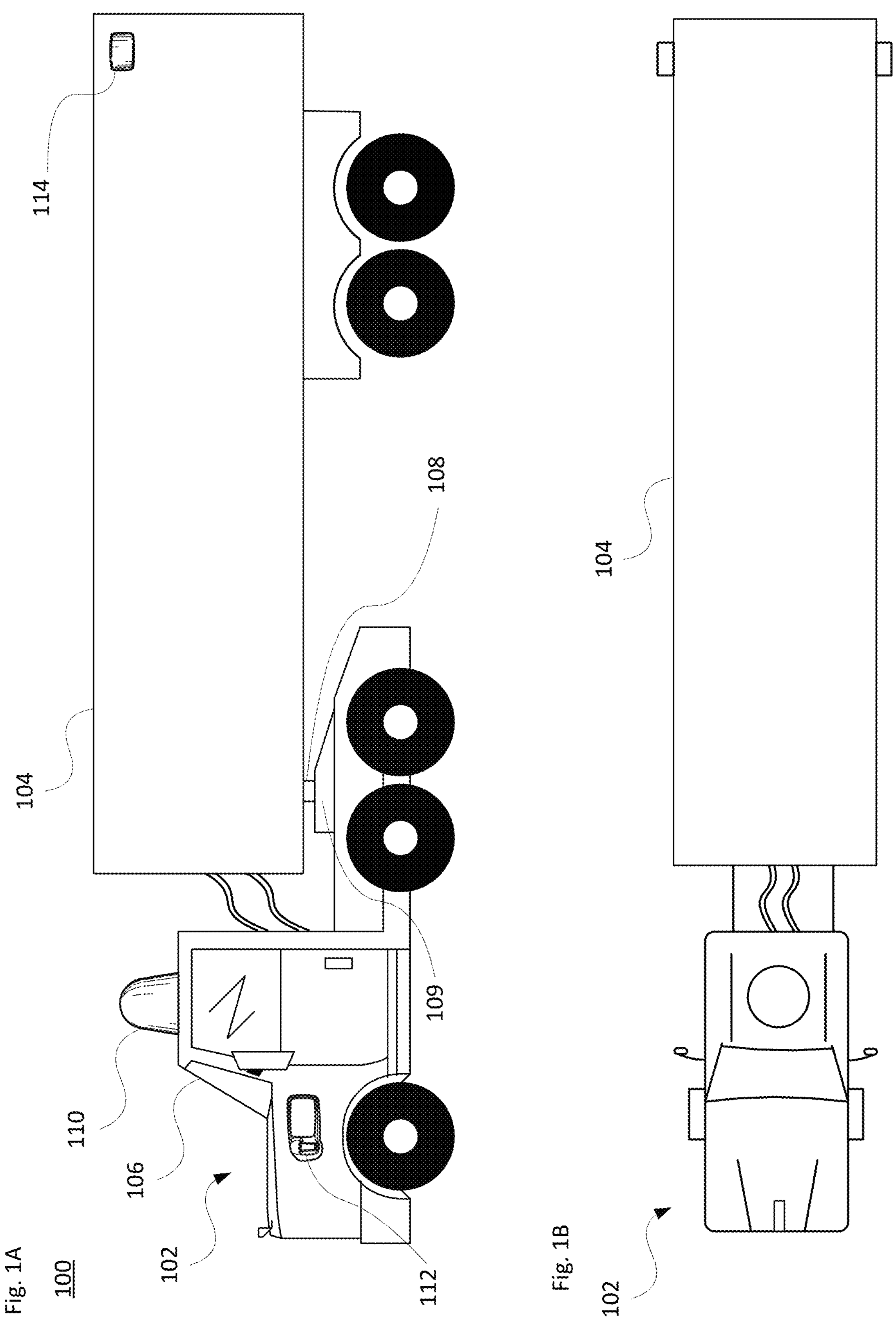
FIGS. 1A-B illustrates an example cargo vehicle arrangement for use with aspects of the technology.
Figure 1C:
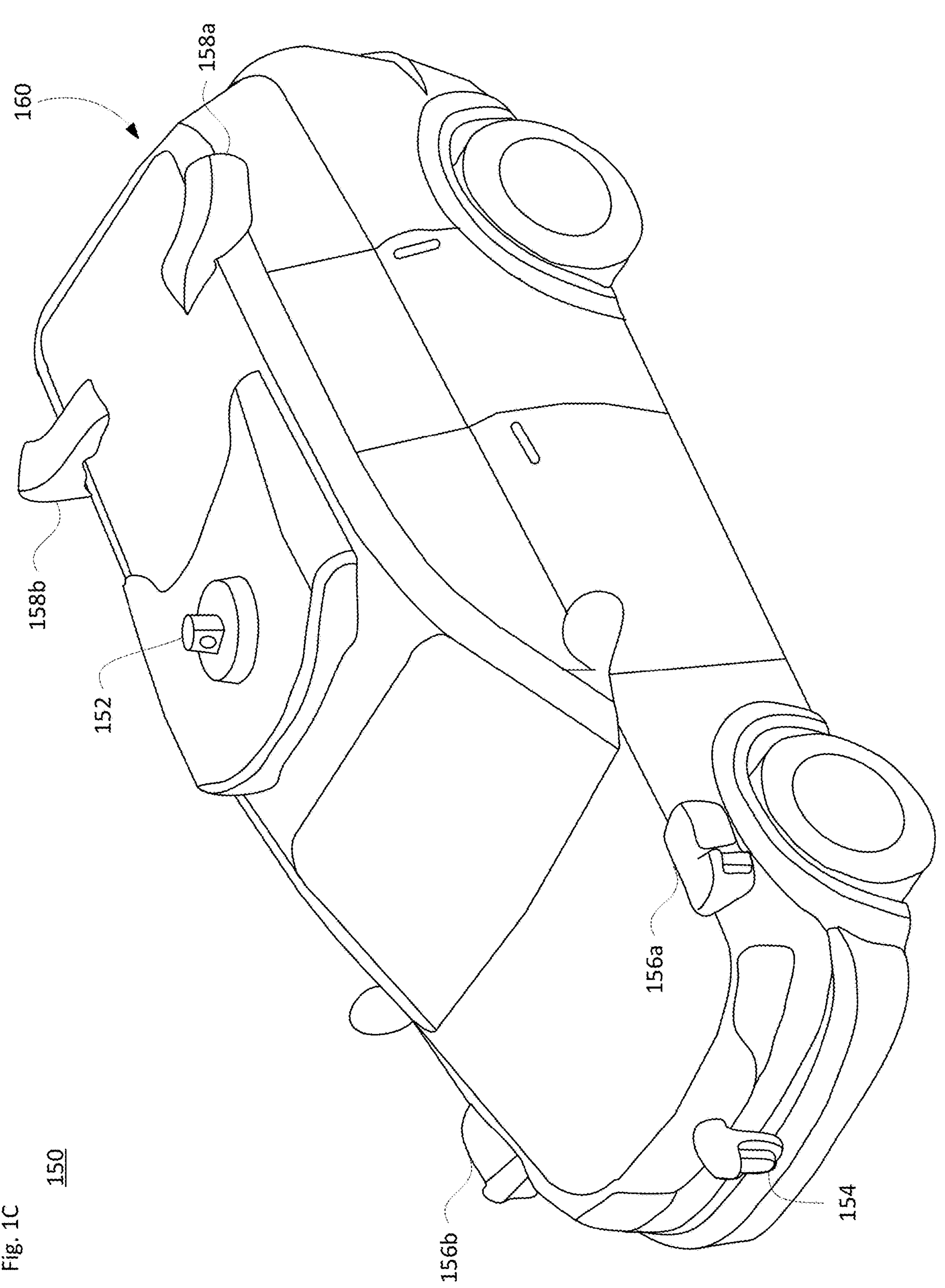
FIG. 1C illustrates an example passenger vehicle arrangement for use with aspects of the technology.

FIGS. 1A-B illustrate an example cargo vehicle 100, such as a tractor-trailer truck, and FIG. 1C illustrates an example passenger vehicle 150, such as a minivan. The cargo vehicle 100 may include, e.g., a single, double or triple trailer, or may be another medium or heavy duty truck such as in commercial weight classes 4 through 8. As shown, the truck includes a tractor unit 102 and a single cargo unit or trailer 104. The trailer 104 may be fully enclosed, open such as a flat bed, or partially open depending on the freight or other type of cargo (e.g., livestock) to be transported. The tractor unit 102 includes the engine and steering systems (not shown) and a cab 106 for a driver and any passengers. In a fully autonomous arrangement, the cab 106 may not be equipped with seats or manual driving components, since no person may be necessary.

The trailer 104 includes a hitching point, known as a kingpin 108. The kingpin 108 is configured to pivotally attach to the tractor unit. In particular, the kingpin attaches to a trailer coupling 109, known as a fifth-wheel, that is mounted rearward of the cab. Sensor units may be deployed along the tractor unit 102 and/or the trailer 104. The sensor units are used to detect information about the surroundings around the cargo vehicle 100. For instance, as shown the tractor unit 102 may include a roof-mounted sensor assembly 110 and one or more side sensor assemblies 112, which the trailer 104 may employ one or more sensor assemblies 114, for example mounted on the left and/or right sides thereof.

Similarly, the passenger vehicle 150 may include various sensors for obtaining information about the vehicle's external environment. For instance, a roof-top housing 152 may include a lidar sensor as well as various cameras and/or radar units. Housing 154, located at the front end of vehicle 150, and housings 156_a_, 156_b_ on the driver's and passenger's sides of the vehicle may each incorporate a Lidar or other sensor. For example, housing 156_a_ may be located in front of the driver's side door along a quarterpanel of the vehicle. As shown, the passenger vehicle 150 also includes housings 158_a_, 158_b_ for radar units, lidar and/or cameras also located towards the rear roof portion of the vehicle. Additional lidar, radar units and/or cameras (not shown) may be located at other places along the vehicle 100. For instance, arrow 160 indicates that a sensor unit may be positioned along the read of the vehicle 150, such as on or adjacent to the bumper.

While certain aspects of the disclosure may be particularly useful in connection with specific types of vehicles, the vehicle may be any type of vehicle including, but not limited to, cars, trucks, motorcycles, buses, recreational vehicles, etc.

Figure 2A:
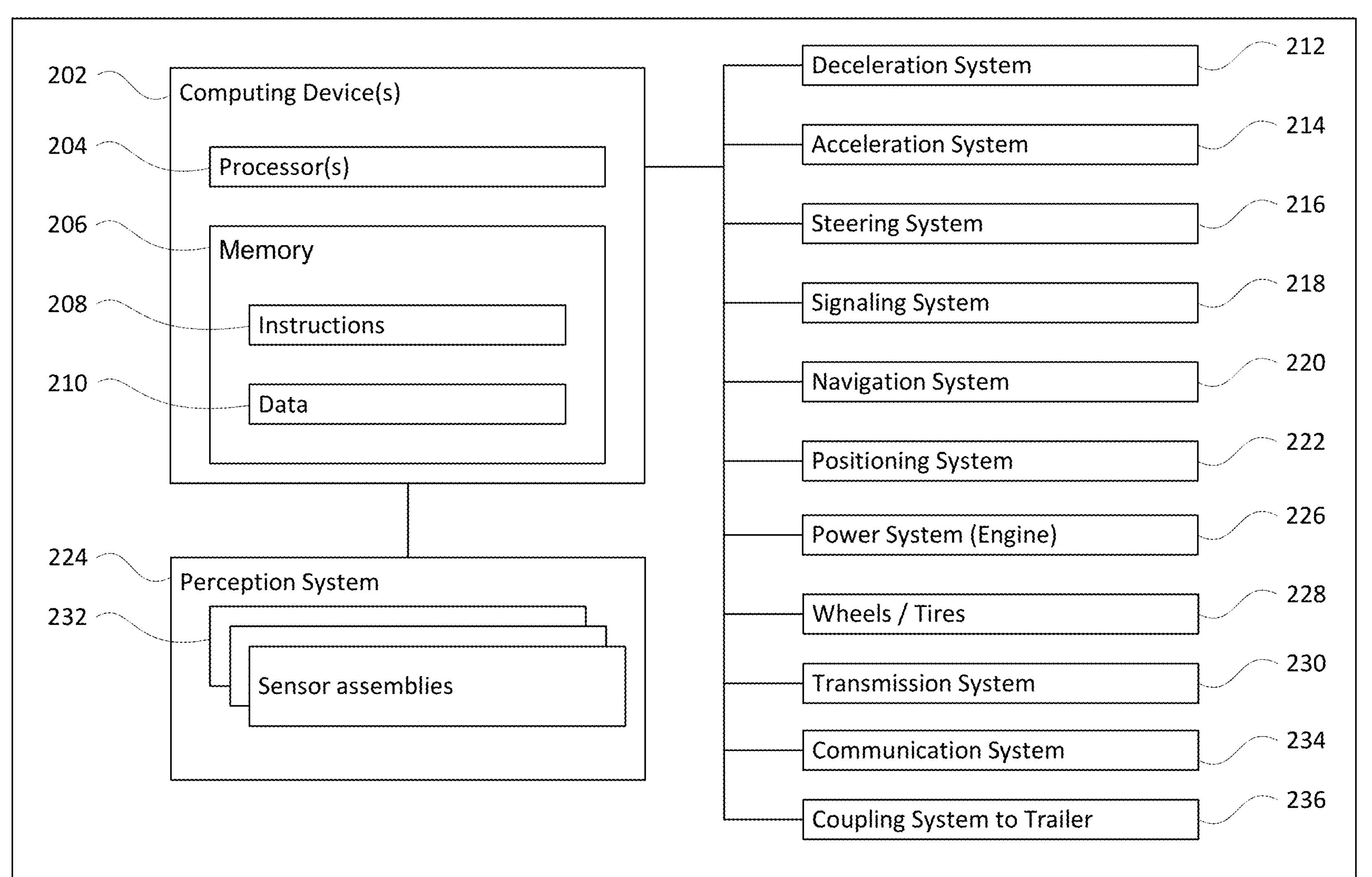
FIGS. 2A-B are functional diagrams of an example tractor-trailer vehicle in accordance with aspects of the disclosure.

FIG. 2A illustrates a block diagram 200 with various components and systems of a cargo vehicle, such as a truck, farm equipment or construction equipment, configured to operate in a fully or semi-autonomous mode of operation. By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

As shown in the block diagram of FIG. 2A, the vehicle includes a control system of one or more computing devices, such as computing devices 202 containing one or more processors 204, memory 206 and other components typically present in general purpose computing devices. The control system may constitute an electronic control unit (ECU) of a tractor unit. The memory 206 stores information accessible by the one or more processors 204, including instructions 208 and data 210 that may be executed or otherwise used by the processor 204. The memory 206 may be of any type capable of storing information accessible by the processor, including a computing device-readable medium. The memory is a non-transitory medium such as a hard-drive, memory card, optical disk, solid-state, tape memory, or the like. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or detected sensor data.

The one or more processor 204 may be any conventional processors, such as commercially available CPUs. Alternatively, the one or more processors may be a dedicated device such as an ASIC or other hardware-based processor. Although FIG. 2A functionally illustrates the processor(s), memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may capable of communicating with various components of the vehicle. For example, returning to FIG. 2A, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle).

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by illuminating turn signals of signaling system 218). Thus, the acceleration system 214 and deceleration system 212 may be a part of a drivetrain or other transmission system 230 that includes various components between an engine of the vehicle and the wheels of the vehicle. Again, by controlling these systems, computing devices 202 may also control the transmission system 230 of the vehicle in order to maneuver the vehicle autonomously.

As an example, computing devices 202 may interact with deceleration system 212 and acceleration system 214 in order to control the speed of the vehicle. Similarly, steering system 216 may be used by computing devices 202 in order to control the direction of vehicle. For example, if the vehicle is configured for use on a road, such as a tractor-trailer truck or a construction vehicle, the steering system 216 may include components to control the angle of wheels of the tractor unit 102 to turn the vehicle. Signaling system 218 may be used by computing devices 202 in order to signal the vehicle's intent to other drivers or vehicles, for example, by lighting turn signals or brake lights when needed.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information, including depot, warehouse or other facility maps. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The perception system 224 also includes sensors for detecting objects external to the vehicle. The detected objects may be other vehicles, obstacles in the roadway, traffic signals, signs, trees, buildings or other structures, etc. For example, the perception system 224 may include one or more light detection and ranging (lidar) sensors, sonar devices, radar units, cameras (e.g., optical and/or infrared), inertial sensors (e.g., gyroscopes or accelerometers), and/or any other detection devices that record data which may be processed by computing devices 202. The sensors of the perception system 224 may detect objects and their characteristics such as location, orientation, size, shape, type (for instance, vehicle, pedestrian, bicyclist, etc.), heading, and speed of movement, etc. The raw data from the sensors and/or the aforementioned characteristics can sent for further processing to the computing devices 202 periodically and continuously as it is generated by the perception system 224. Computing devices 202 may use the positioning system 222 to determine the vehicle's location and perception system 224 to detect and respond to objects when needed to reach the location safely. In addition, the computing devices 202 may perform calibration of individual sensors, all sensors in a particular sensor assembly, or between sensors in different sensor assemblies.

As indicated in FIG. 2A, the sensors of the perception system 224 may be incorporated into one or more sensor assemblies 232. In one example, the sensor assemblies 232 may be arranged as sensor towers integrated into the side-view mirrors on the truck, farm equipment, construction equipment or the like. Sensor assemblies 232 may also be positioned at different locations on the tractor unit 102 or on the trailer 104 (see FIGS. 1A-B), or along different portions of passenger vehicle 150 (see FIG. 1C). The computing devices 202 may communicate with the sensor assemblies located on both the tractor unit 102 and the trailer 104 or distributed along the passenger vehicle 150. Each assembly may have one or more types of sensors such as those described above.

Also shown in FIG. 2A is a communication system 234 and a coupling system 236 for connectivity between the tractor unit and the trailer. The coupling system 236 includes a fifth-wheel at the tractor unit and a kingpin at the trailer. The communication system 234 may include one or more wireless network connections to facilitate communication with other computing devices, such as passenger computing devices within the vehicle, and computing devices external to the vehicle, such as in another nearby vehicle on the roadway or at a remote network. The network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 2B:
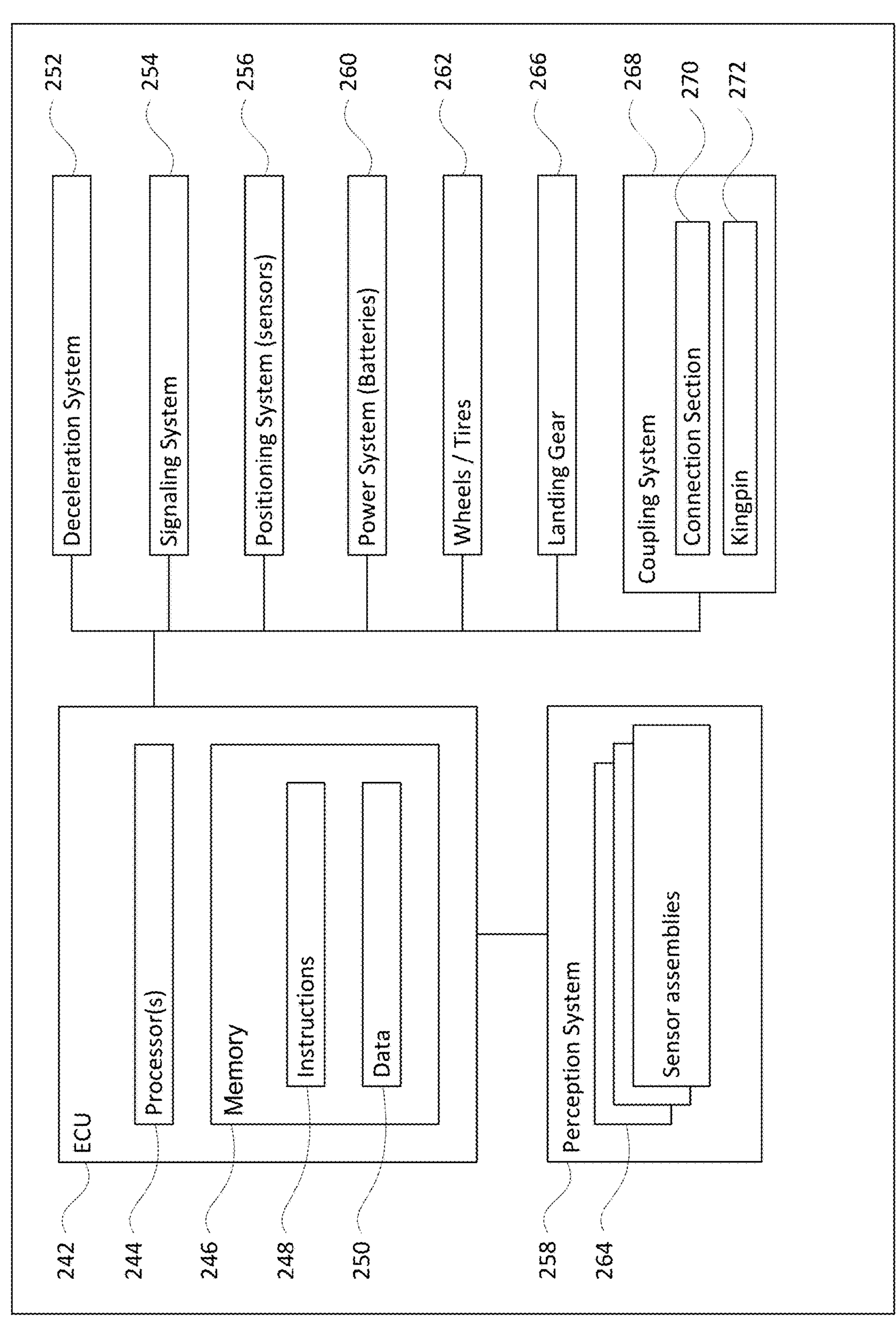

FIG. 2B illustrates a block diagram 240 of an example trailer. As shown, the system includes an ECU 242 of one or more computing devices, such as computing devices containing one or more processors 244, memory 246 and other components typically present in general purpose computing devices. The memory 246 stores information accessible by the one or more processors 244, including instructions 248 and data 250 that may be executed or otherwise used by the processor(s) 244. The descriptions of the processors, memory, instructions and data from FIG. 2A apply to these elements of FIG. 2B.

The ECU 242 is configured to receive information and control signals from the trailer unit. The on-board processors 244 of the ECU 242 may communicate with various systems of the trailer, including a deceleration system 252 (for controlling braking of the trailer), signaling system 254 (for controlling turn signals), and a positioning system 256 (for determining the position of the trailer). The ECU 242 may also be operatively coupled to a perception system 258 (for detecting objects in the trailer's environment) and a power system 260 (for example, a battery power supply) to provide power to local components. Some or all of the wheels/tires 262 of the trailer may be coupled to the deceleration system 252, and the processors 244 may be able to receive information about tire pressure, balance, wheel speed and other factors that may impact driving in an autonomous mode, and to relay that information to the processing system of the tractor unit. The deceleration system 252, signaling system 254, positioning system 256, perception system 258, power system 260 and wheels/tires 262 may operate in a manner such as described above with regard to FIG. 2A. For instance, the perception system 258, if employed as part of the trailer, may include at least one sensor assembly 264 having one or more lidar sensors, sonar devices, radar units, cameras, inertial sensors, and/or any other detection devices that record data which may be processed by the ECU 242 or by the processors 204 of the tractor unit.

The trailer also includes a set of landing gear 266, as well as a coupling system 268. The landing gear 266 provide a support structure for the trailer when decoupled from the tractor unit. The coupling system 268, which may be a part of coupling system 236 of the tractor unit, provides connectivity between the trailer and the tractor unit. The coupling system 268 may include a connection section 270 to provide backward compatibility with legacy trailer units that may or may not be capable of operating in an autonomous mode.

The coupling system includes a kingpin 272 configured for enhanced connectivity with the fifth-wheel of an autonomous-capable tractor unit.

Figure 3:
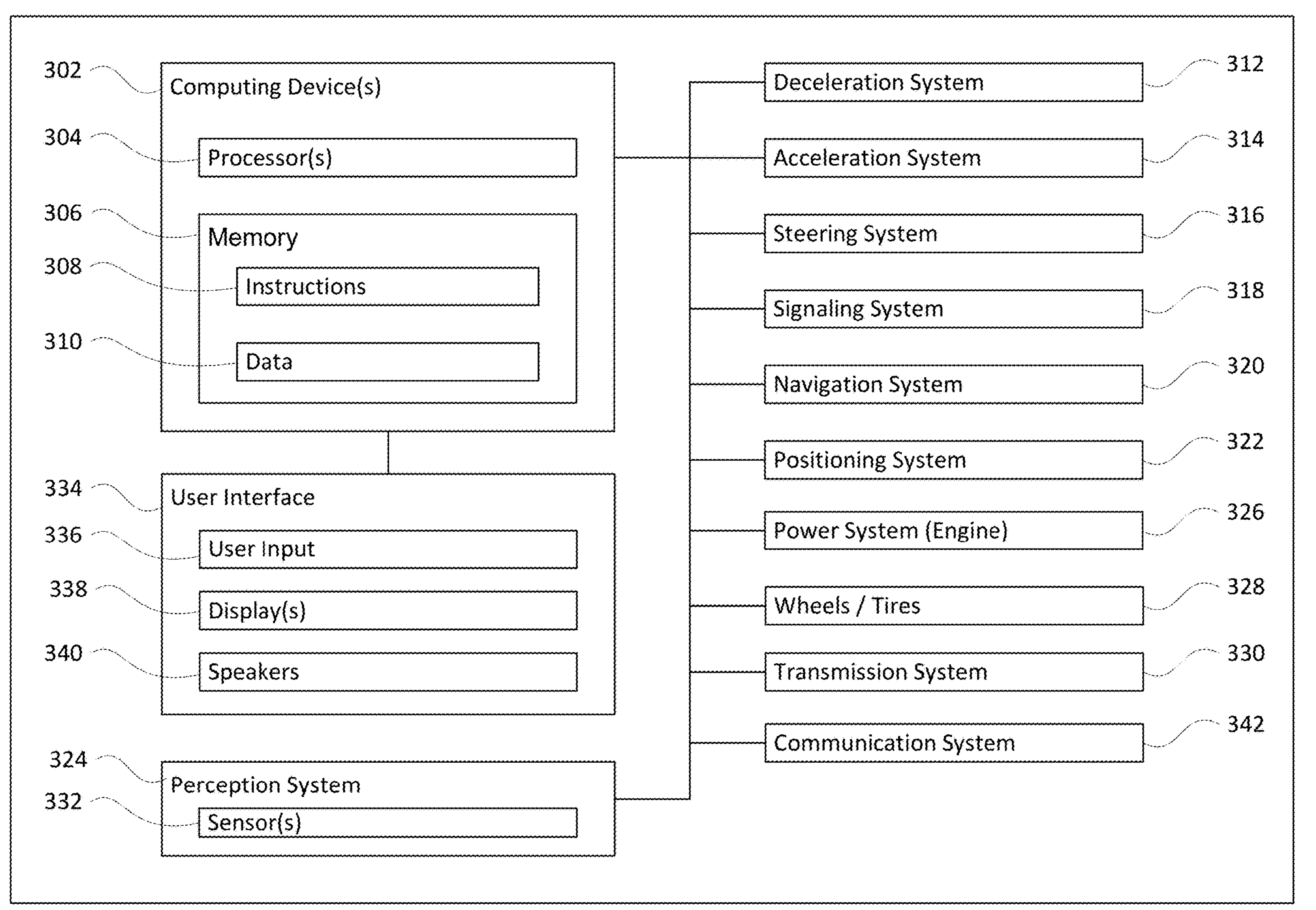
FIG. 3 is a function diagram of an example passenger vehicle in accordance with aspects of the disclosure.

FIG. 3 illustrates a block diagram 300 of various systems of a passenger vehicle. As shown, the system includes one or more computing devices 302, such as computing devices containing one or more processors 304, memory 306 and other components typically present in general purpose computing devices. The memory 306 stores information accessible by the one or more processors 304, including instructions 308 and data 310 that may be executed or otherwise used by the processor(s) 304. The descriptions of the processors, memory, instructions and data from FIG. 2A apply to these elements of FIG. 3.

As with the computing devices 202 of FIG. 2A, the computing devices 302 of FIG. 3 may control computing devices of an autonomous driving computing system or incorporated into a passenger vehicle. The autonomous driving computing system may be capable of communicating with various components of the vehicle in order to control the movement of the passenger vehicle according to primary vehicle control code of memory 306. For example, computing devices 302 may be in communication with various, such as deceleration system 312, acceleration system 314, steering system 316, signaling system 318, navigation system 320, positioning system 322, perception system 324, power system 326 (e.g., the vehicle's engine or motor), transmission system 330 in order to control the movement, speed, etc. of the in accordance with the instructions 208 of memory 306. The wheels/tires 328 may be controlled directly by the computing devices 302 or indirectly via these other systems. These components and subsystems may operate as described above with regard to FIG. 2A. For instance, the perception system 324 also includes one or more sensors 332 for detecting objects external to the vehicle. The sensors 332 may be incorporated into one or more sensor assemblies as discussed above.

Computing devices 202 may include all of the components normally used in connection with a computing device such as the processor and memory described above as well as a user interface subsystem 334. The user interface subsystem 334 may include one or more user inputs 336 (e.g., a mouse, keyboard, touch screen and/or microphone) and various electronic displays 338 (e.g., a monitor having a screen or any other electrical device that is operable to display information). In this regard, an internal electronic display may be located within a cabin of the passenger vehicle (not shown) and may be used by computing devices 302 to provide information to passengers within the vehicle. Output devices, such as speaker(s) 340 may also be located within the passenger vehicle.

A communication system 342 is also shown, which may be similar to the communication system 234 of FIG. 2A. For instance, the communication system 342 may also include one or more wireless network connections to facilitate communication with other computing devices, such as passenger computing devices within the vehicle, and computing devices external to the vehicle, such as in another nearby vehicle on the roadway, or a remote server system. The network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Example Implementations

In view of the structures and configurations described above and illustrated in the figures, various implementations will now be described.

In order to detect the environment and conditions around the vehicle, different types of sensors and layouts may be employed. Examples of these were discussed above with regard to FIGS. 1-2. The field of view (FOV) for each sensor can depend on the sensor placement on a particular vehicle. In one scenario, the information from one or more different kinds of sensors may be employed so that the tractor-trailer or other vehicle may operate in an autonomous mode. Each sensor may have a different range, resolution and/or FOV.

For instance, the sensors may include a long range FOV lidar and a short range FOV lidar. In one example, the long range lidar may have a range exceeding 50-250 meters, while the short range lidar has a range no greater than 1-50 meters. Alternatively, the short range lidar may generally cover up to 10-15 meters from the vehicle while the long range lidar may cover a range exceeding 100 meters. In another example, the long range is between 10-200 meters, while the short range has a range of 0-20 meters. In a further example, the long range exceeds 80 meters while the short range is below 50 meters. Intermediate ranges of between, e.g., 10-100 meters can be covered by one or both of the long range and short range lidars, or by a medium range Lidar that may also be included in the sensor system. In addition to or in place of these Lidars, a set of cameras (e.g., optical and/or infrared) may be arranged, for instance to provide forward, side and rear-facing imagery. Similarly, a set of radar sensors may also be arranged to provide forward, side and rear-facing data.

Figure 4A:
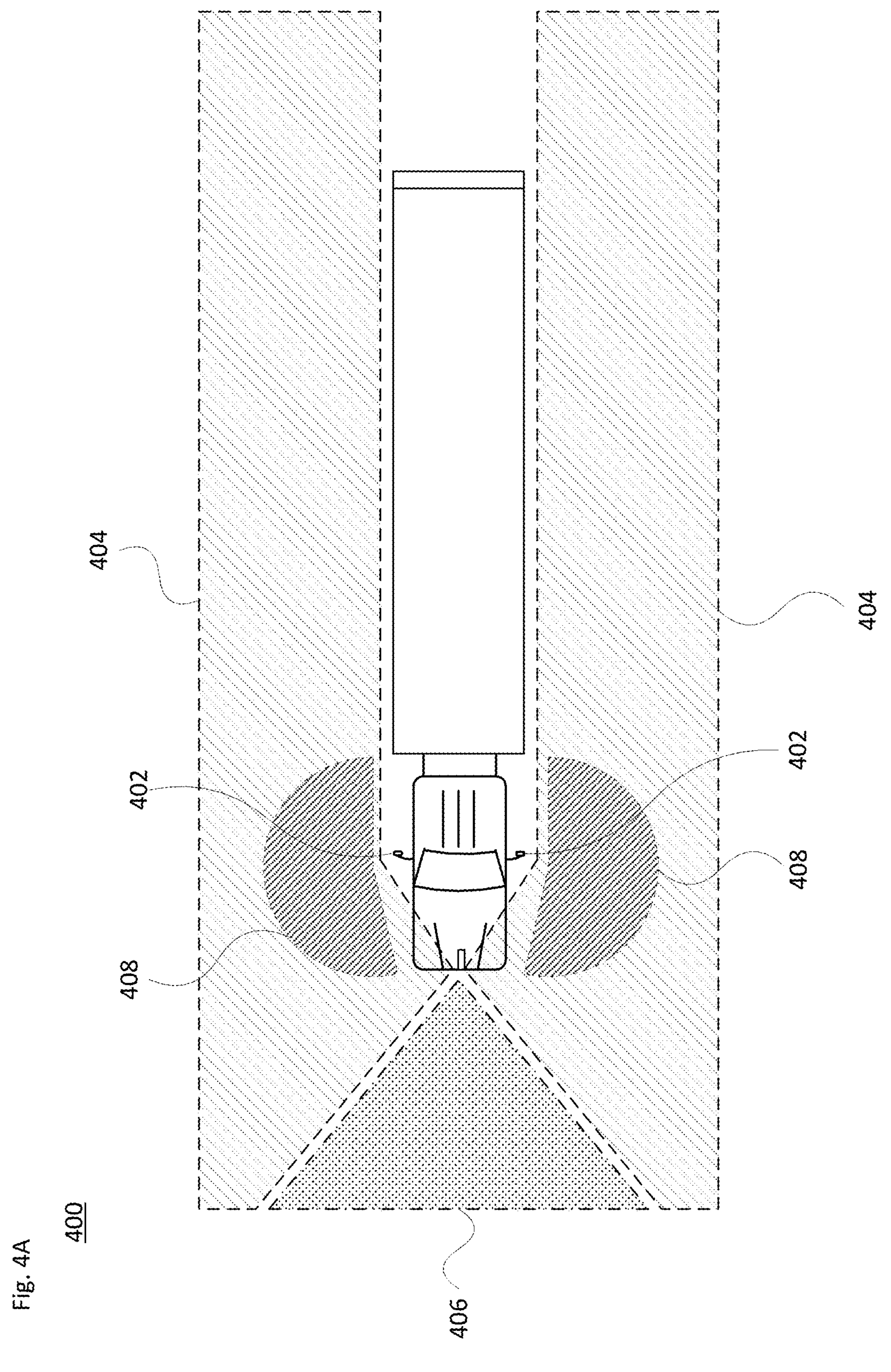
FIGS. 4A-B illustrate example sensor fields of view for use with aspects of the technology.
Figure 4B:
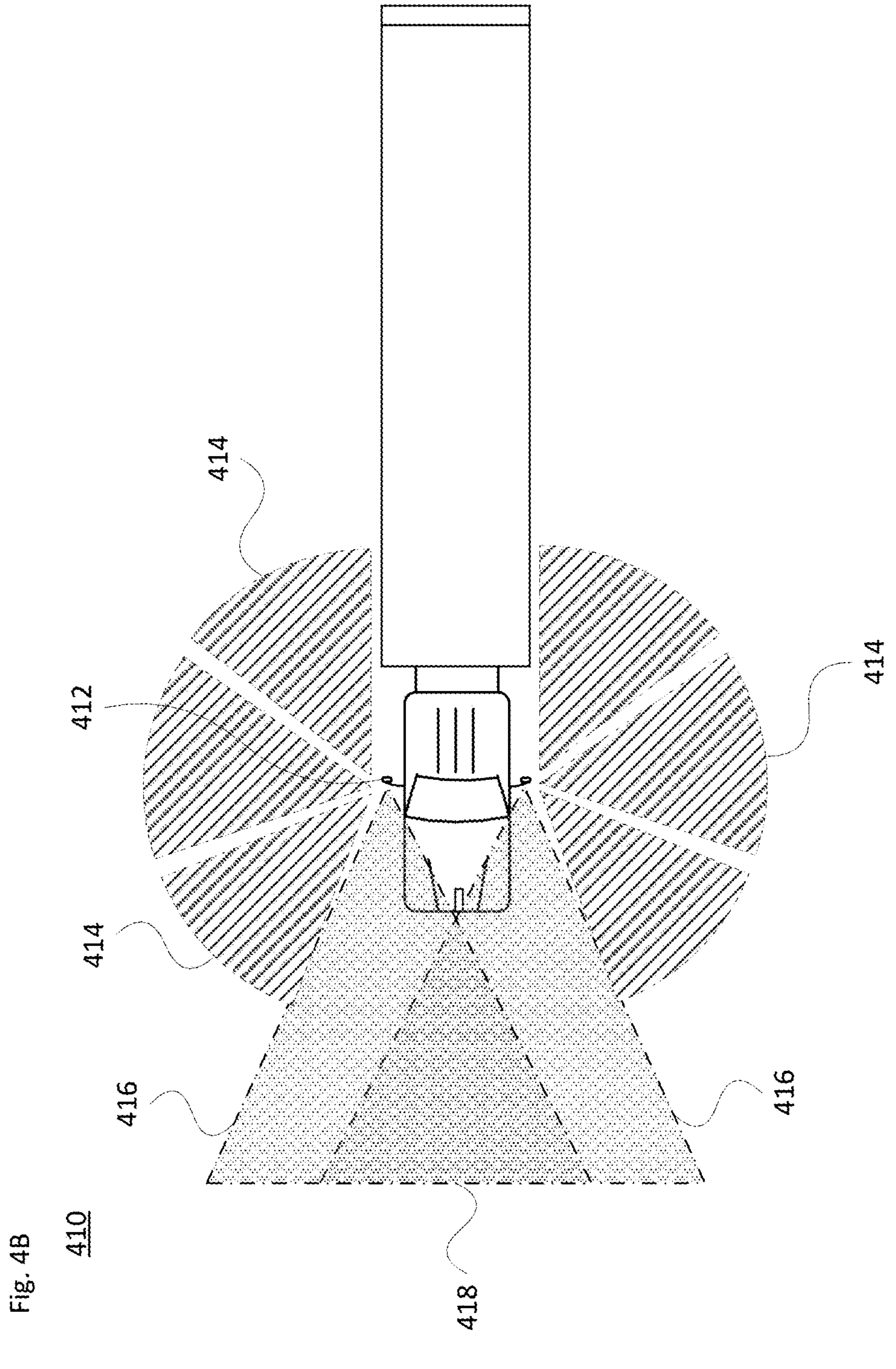

FIGS. 4A-B illustrate example sensor configurations and fields of view on a cargo vehicle. In particular, FIG. 4A presents one configuration 400 of lidar, camera and radar sensors. In this figure, one or more lidar units may be located in sensor housing 402. In particular, sensor housings 402 may be located on either side of the tractor unit cab, for instance integrated into a side view mirror assembly or extending from the roof of the cab. In one scenario, long range lidars may be located along a top or upper area of the sensor housings 402. For instance, this portion of the housing 402 may be located closest to the top of the truck cab or roof of the vehicle. This placement allows the long range lidar to see over the hood of the vehicle. And short range lidars may be located along a bottom area of the sensor housings 402, closer to the ground, and opposite the long range lidars in the housings. This allows the short range lidars to cover areas immediately adjacent to the cab. This would allow the perception system to determine whether an object such as another vehicle, pedestrian, bicyclist, etc., is next to the front of the vehicle and take that information into account when determining how to drive or turn in view of an aberrant condition.

As illustrated in FIG. 4A, the long range lidars on the left and right sides of the tractor unit have fields of view 404. These encompass significant areas along the sides and front of the vehicle. As shown, there is an overlap region 406 of their fields of view in front of the vehicle. A space is shown between regions 404 and 406 for clarity; however in actuality there would desirably be overlapping coverage. The short range lidars on the left and right sides have smaller fields of view 408. The overlap region 406 provides the perception system with additional or information about a very important region that is directly in front of the tractor unit. This redundancy also has a safety aspect. Should one of the long range lidar sensors suffer degradation in performance, the redundancy would still allow for operation in an autonomous mode.

FIG. 4B illustrates coverage 410 for either (or both) of radar and camera sensors on both sides of a tractor-trailer. Here, there may be multiple radar and/or camera sensors in each of the sensor housings 412. As shown, there may be sensors with side and rear fields of view 414 and sensors with forward facing fields of view 416. The sensors may be arranged so that the side and rear fields of view 414 overlap, and the side fields of view may overlap with the forward facing fields of view 416. As with the long range lidars discussed above, the forward facing fields of view 416 also have an overlap region 418. This overlap region provides similar redundancy to the overlap region 406, and has the same benefits should one sensor suffer degradation in performance.

While not illustrated in FIGS. 4A-4B, other sensors may be positioned in different locations to obtain information regarding other areas around the vehicle, such as along the rear or underneath the vehicle.

Example Scenarios

As noted above, there are various situations in which the self-driving vehicle may transition between fully and semi-autonomous driving. One particularly relevant scenario involves cargo transportation. Here, a truck or other vehicle may be traveling on highways or other roads in a fully autonomous mode, but need to transition to a semi-autonomous mode as it approaches the destination. In some examples, the destination may be a warehouse, depot, delivery center or service center. These destinations may be specifically designed to receive multiple trucks or other large vehicles, with limited room to park or maneuver.

Figure 5A:
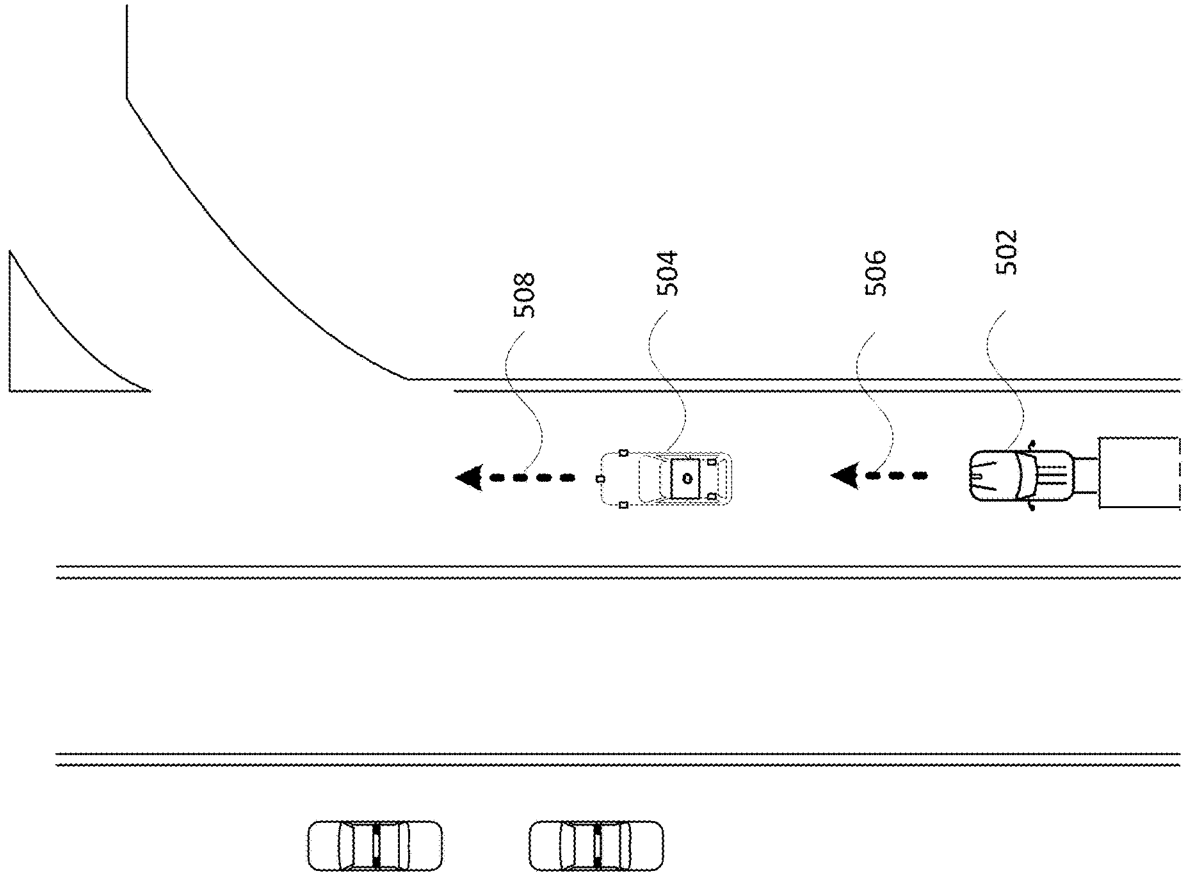
FIGS. 5A-B illustrate an example lead-follow driving scenario in accordance with aspects of the disclosure.
Figure 5B:
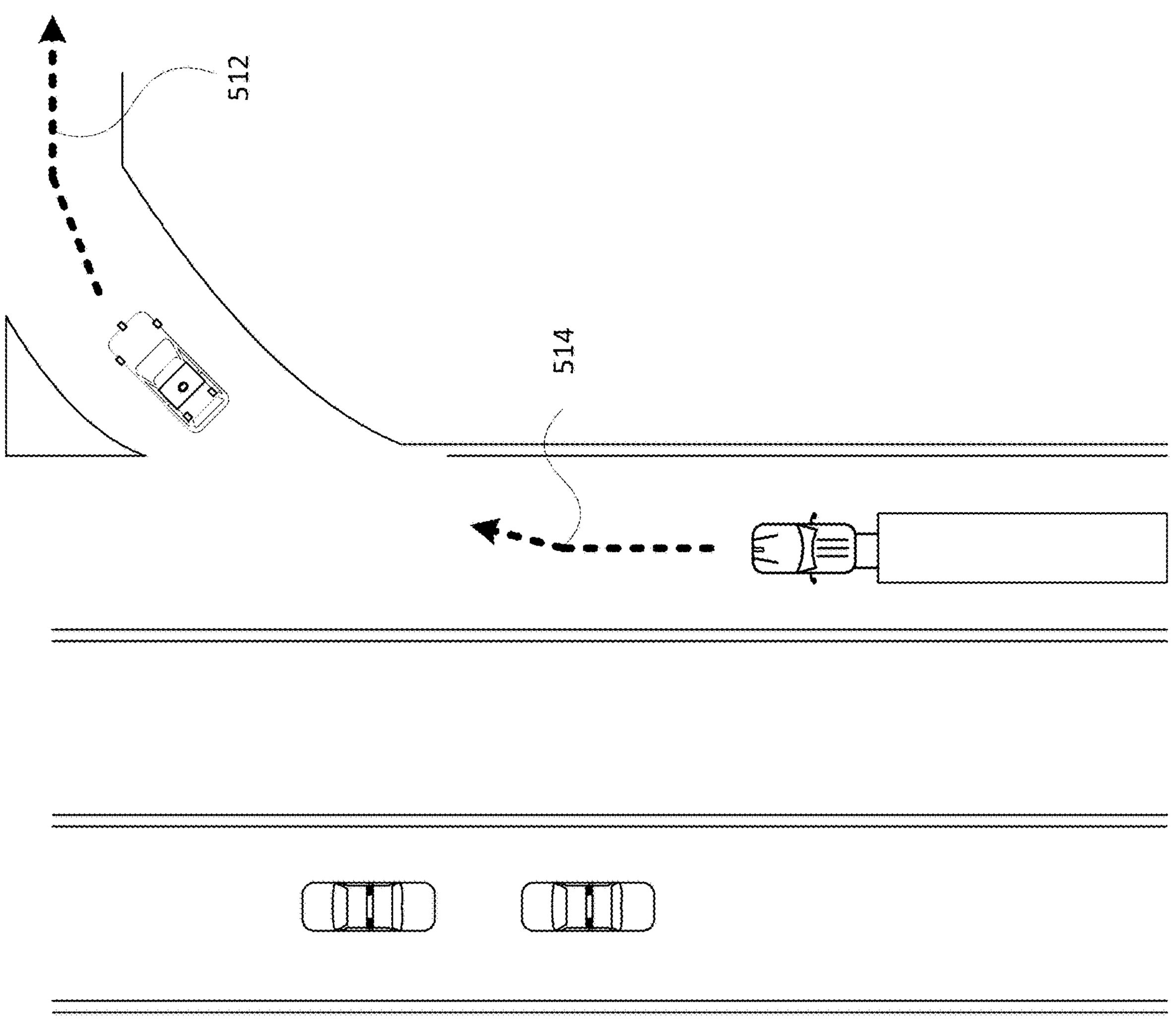

In one scenario, a cargo vehicle, such as a long-haul commercial truck, may spend a significant portion of the trip driving on freeways or other roadways that permit fully autonomous driving. Once the cargo vehicle gets close to its destination, it may need to exit a freeway and take one or more surface streets. In this scenario, upon exiting the freeway the cargo vehicle changes from a fully autonomous driving mode where the onboard systems (see FIGS. 2A, 2B and 3) make all driving decisions to a different driving mode that is partially autonomous. In this partially autonomous driving mode, the onboard systems do not make all driving decisions. For instance, as illustrated in FIGS. 5A-B, cargo vehicle 502 will follow a lead vehicle 504.

The lead vehicle 504 may be a car, cargo truck or other vehicle that is able to drive partly or entirely to the following vehicle's destination. Alternatively, an unmanned aerial vehicle (UAV) such as a drone may be employed in place of or in combination with the lead vehicle. For instance, when used in combination with lead vehicle, the UAV could act as an additional set of sensors, essentially assisting both the lead and follow vehicles see where one or both may have a blind spot, e.g., behind the trailer, or in some occluded areas. Here, the sensor information obtained by the UAV would be provided to the lead vehicle and optionally to any follow vehicles.

Before following the lead vehicle, the lead vehicle may need to be identified and/or authenticated to the cargo vehicle (or vice versa). This can be done directly between the two vehicles. Alternatively, a remote system in communication with the cargo vehicle can assist with authentication.

In one example, authentication may be accomplished via a remote system that the cargo vehicle is in communication with. For instance, the lead vehicle may send a request to a remote server for the cargo vehicle to enter a special "search for leader" mode and the remote server would push this state down to the cargo vehicle. The lead vehicle may only send this command once it is in front of and ready to pilot the cargo vehicle, e.g., including determining that it is able to drive to the cargo vehicle's destination. This state could be set up to last only for a short period of time (e.g., 1-10 seconds, or no more than 1 minute) so that the cargo vehicle would not mistakenly identify any other vehicle as a lead vehicle. Another method of authenticating would rely on a remote operator or other aspects of the remote system to identify and mark a vehicle on the roadway as the lead vehicle, and remotely put the cargo vehicle in the "follow" mode to follow the lead vehicle. Here, for instance, a remote operator may identify the lead vehicle on his or her display screen and transmit information associated with the marked lead vehicle to the cargo vehicle. This information may include, e.g., location coordinates, map data, imagery, vehicle-specific identifiers, etc.

In association with authentication, the lead vehicle may have a unique QR code or other identifier information such as a license plate number recognizable by the cargo vehicle's sensors such that when authentication is occurring, the lead vehicle (or a person in the lead vehicle) sends along that specific identifier information. This could make it highly unlikely or effectively impossible for the cargo vehicle to mistake any other vehicle for the lead vehicle.

FIG. 5A illustrates a first view 500, in which both the cargo vehicle 502 and lead vehicle 504 are traveling along a freeway or other roadway. Authentication between the two vehicles may occur at a prearranged location along the route, at a selected time, when the two vehicles are within line of sight or a predetermined distance of one another. FIG. 5B illustrates a second view 510, in which the lead vehicle has begun to exit the roadway along a path indicated by dashed arrow 512. The cargo vehicle follows the lead vehicle as shown by dashed arrow 514.

The lead vehicle may or may not operate in an autonomous driving mode. For example, the lead vehicle may employ an in-vehicle (or remote) human driver. Here, in one scenario human driven truck drivers may enroll in a program whereby they indicate they are willing to operate a lead vehicle (either in-vehicle or remotely), provide their destination, and potentially be compensated for acting as a lead vehicle operator. In another example, the lead vehicle may be authorized to operate in an autonomous mode on the surface streets in a way that allows the truck to follow it, even though the truck is not permitted or chooses not to operate in a fully autonomous mode.

Multiple trucks may follow the lead vehicle. Here, authentication with the lead vehicle may be required for each truck. Optionally, the second or later-following truck(s) may identify or otherwise authenticate an immediately preceding vehicle, which may be another truck. For instance, multiple trucks could all authenticate through a common server connection. Each truck could send its pose information and confirm its proximity to the truck in front of it. Here, each truck could continue following the immediately preceding truck based on stored perception classification modules.

As part of the follow the lead vehicle approach, the lead vehicle is responsible for "clearing" the route, such as at intersections, difficult turns, railroad crossings, etc. to ensure the cargo vehicle is able to safely traverse the route. By way of example, the lead vehicle's onboard systems (e.g., planning system) may store information about what the cargo vehicle needs to do to drive on the roadway. Here, the lead vehicle can effectively run two (or more) computer models to take into account both itself and the following vehicle(s).

In one example, the lead vehicle could clear the area such that it knows the following vehicles will have enough time to maneuver behind it without the need for significant perception besides following the lead vehicle. For instance, the following vehicles would not need to use onboard sensors to identify or track other objects on or near the roadway. In another example, the following vehicles could all be transmitting their real-time state information to the lead vehicle either directly or via a remote server. Thus, the lead vehicle will be able to determine how much time it will take each following vehicle to cross an intersection, and whether that time is sufficient given the other detected objects at or near the intersection.

The real-time state information for each following vehicle may include, e.g., location, speed and current pose. Such information may also or alternatively include cargo information, e.g., both the weight and nature of cargo, because this can influence the follow vehicle's dynamics. Other state information may relate to a roadgraph of the section of roadway of interest. This can include general roadgraph details, such as road pitch/incline, friction (in case of rain, or in case of unpaved roads). It may also include vehicle specific roadgraph details, e.g., lanes where trucks are not allowed, clearance (height), speed limits for trucks, etc. Some or all of the roadgraph state information may be maintained in an onboard database of the lead vehicle and/or following vehicle(s), or it may be provided by a remote system to the lead vehicle (and optionally to the following vehicle(s)) as needed.

The lead vehicle may also (primarily) handle the perception for itself and the following vehicle(s). It is possible that in some situations, perception information may be passed from the following vehicle(s) to the lead vehicle, or vice versa. This may happen, for instance, when one or more sensors fail, the quality of the sensor data falls below some permissible threshold, or an occlusion is detected.

When following the lead vehicle, the truck may employ a "close follow" mode, for example driving less than one vehicle length (or more or less) behind the lead vehicle. The truck can also stop or take other corrective action should another vehicle or other object interpose between the lead vehicle and itself. This may include pulling over or requesting that the lead vehicle pull over, increasing the follow distance (e.g., from 1 vehicle length to 3 vehicle lengths or more), etc.

Figure 6A:
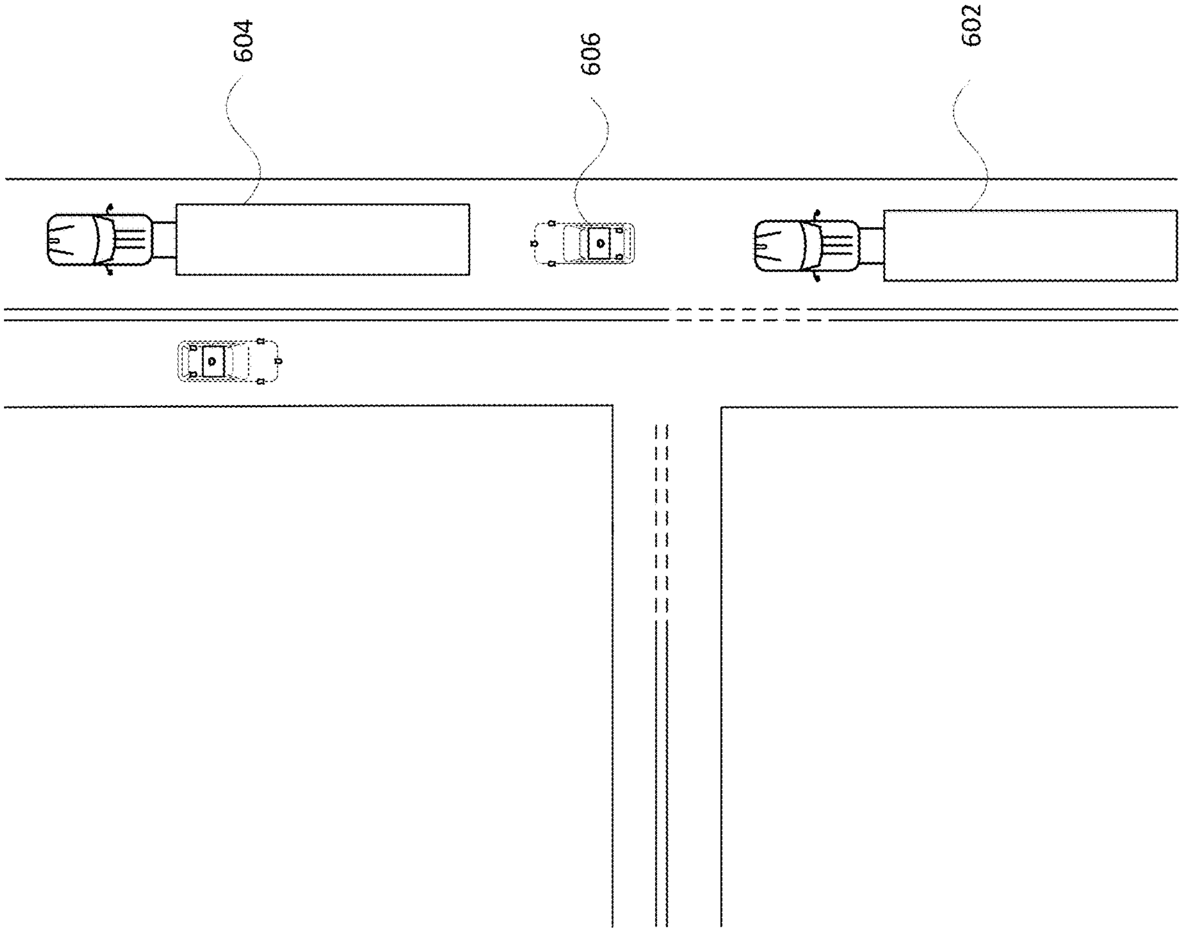
FIGS. 6A-C illustrate driving scenarios with an intervening vehicle in accordance with aspects of the disclosure.
Figure 6B:
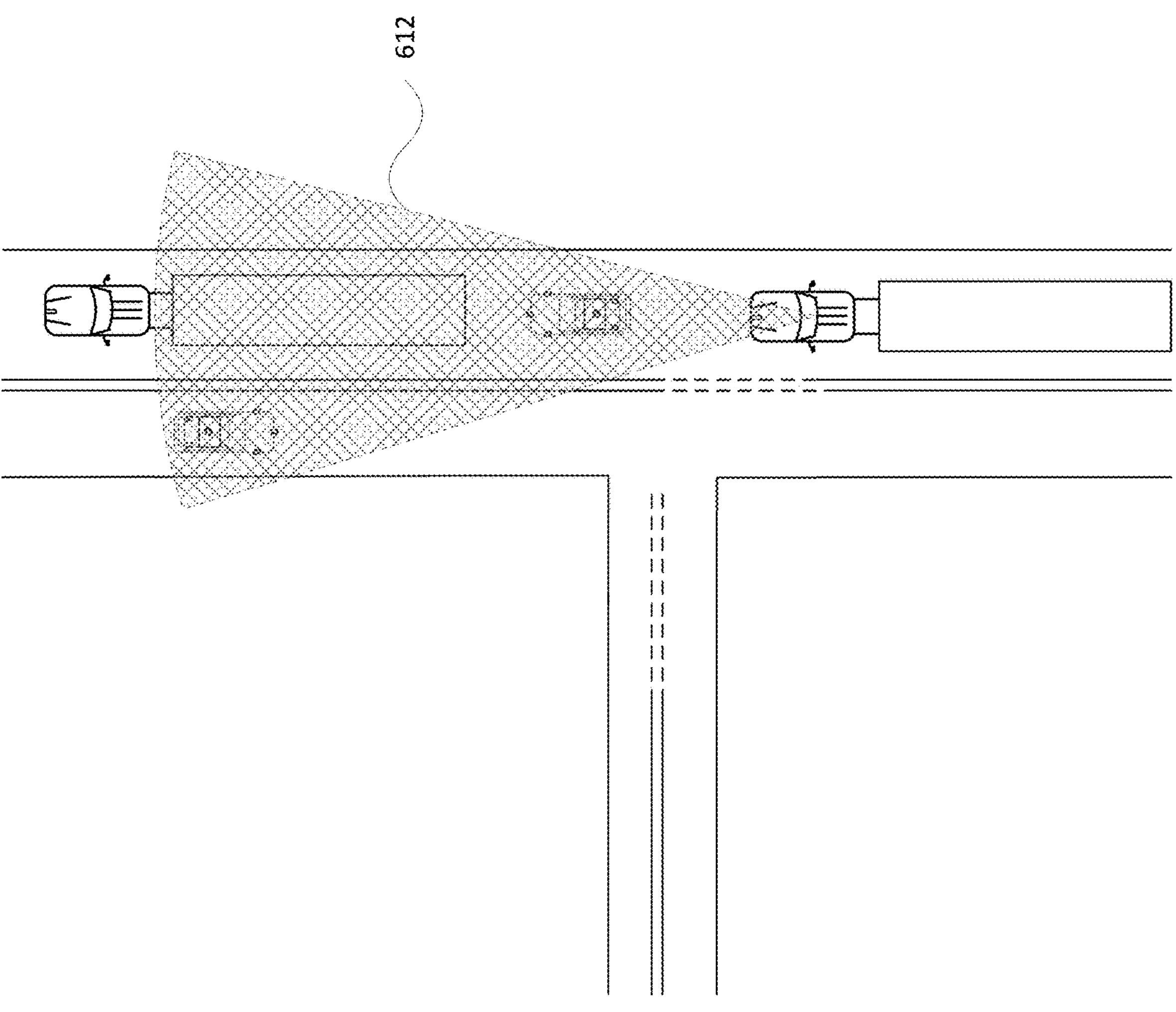
Figure 6C:
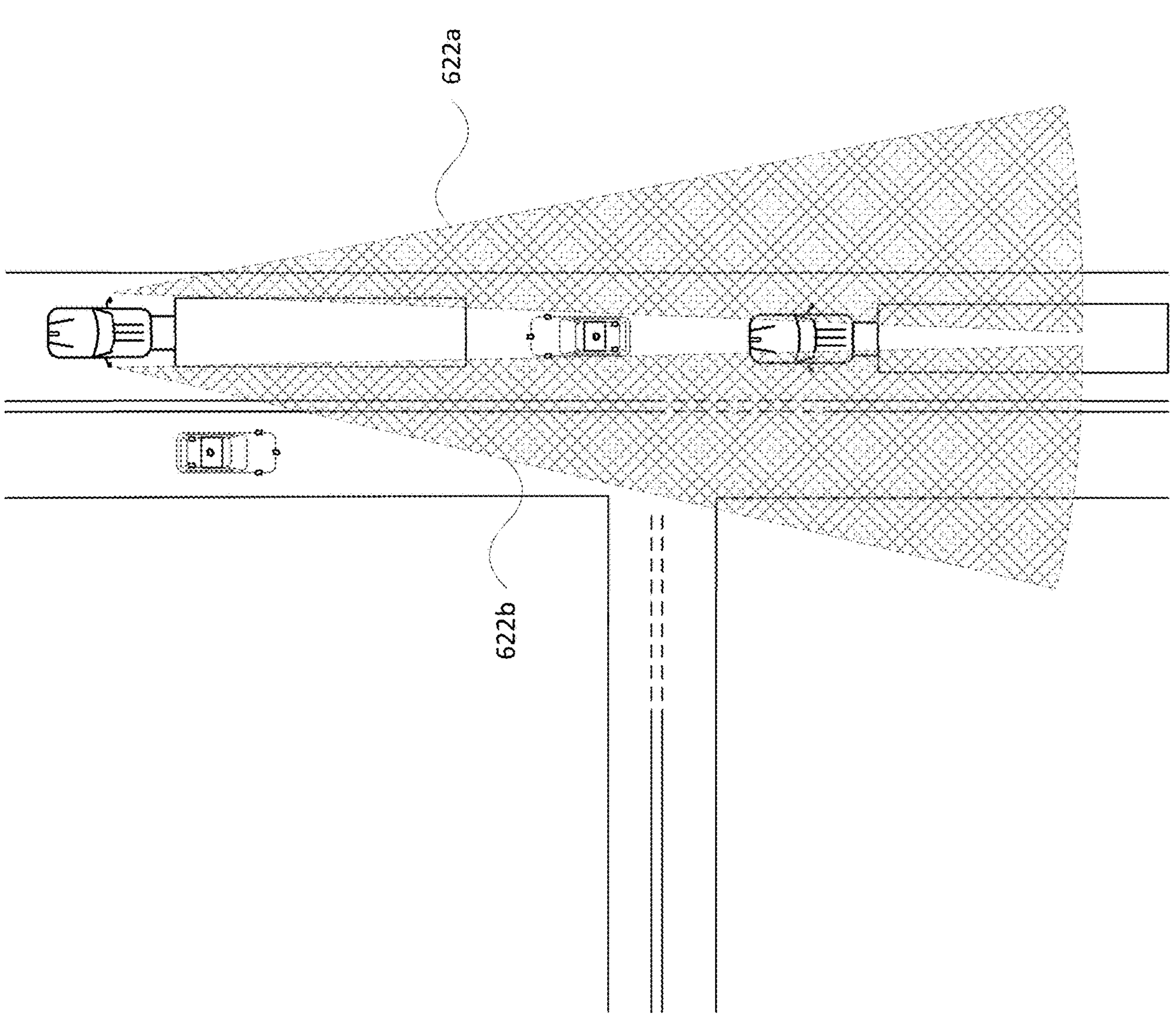

FIGS. 6A-C illustrate examples involving an intervening vehicle. For instance, FIG. 6A shows one illustration 600 where one cargo truck 602 is following a lead truck 604. Here, a car 606 had pulled into the lane between the two truck. As shown in illustration 610 FIG. 6B, the following truck 602 may use one or more of its sensors to obtain a field of view 612 that encompasses both the intervening car 606 and the lead truck 604. Information from the field of view 612 may be passed as part of the state information to the lead vehicle 606, and one or both of the lead vehicle and the following vehicle may modify their driving operations based on this information. As shown in illustration 620 of FIG. 6C, the lead truck 604 may employ sensors with fields of view 622*a* and 622*b*. Here, while these sensors may detect the following vehicle, they may have a blind spot directly behind the lead vehicle in the region where the intervening car is location. In this case, information provided by the following vehicle (e.g., from the sensor FOV 612 of FIG. 6B) can be supplied to the lead vehicle to supplement its perception information.

Figure 7A:
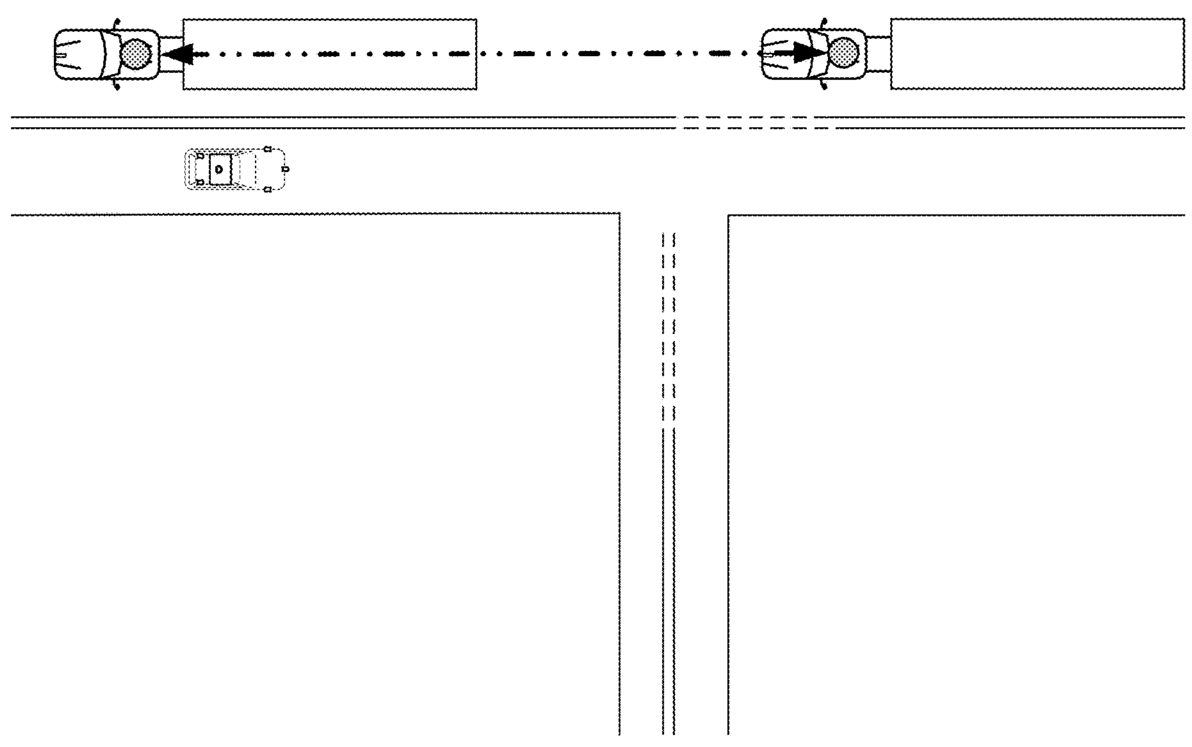
FIGS. 7A-D illustrate exemplary vehicle to vehicle communication scenarios in accordance with aspects of the disclosure.

Information about a vehicle or its immediate environment may be passed to the lead or to the following vehicle, for instance by transmitting FOV information in the above examples. The information transmission may take place directly between the lead and following vehicles, as illustrated in example 700 of FIG. 7A. This may be done via optical (e.g., lidar to lidar) communication or radio frequency communication. It may be desirable to minimize the amount of information passed between the following truck and the lead vehicle. For instance, information about intervening vehicles, upcoming street signs, road surface conditions, etc. may be sent via a wireless communication link (e.g., cellular, Bluetooth™, or lidar communication). The amount of information passed may vary depending on the type of following truck and/or lead vehicle, network access/bandwidth availability, etc.

Figure 7B:
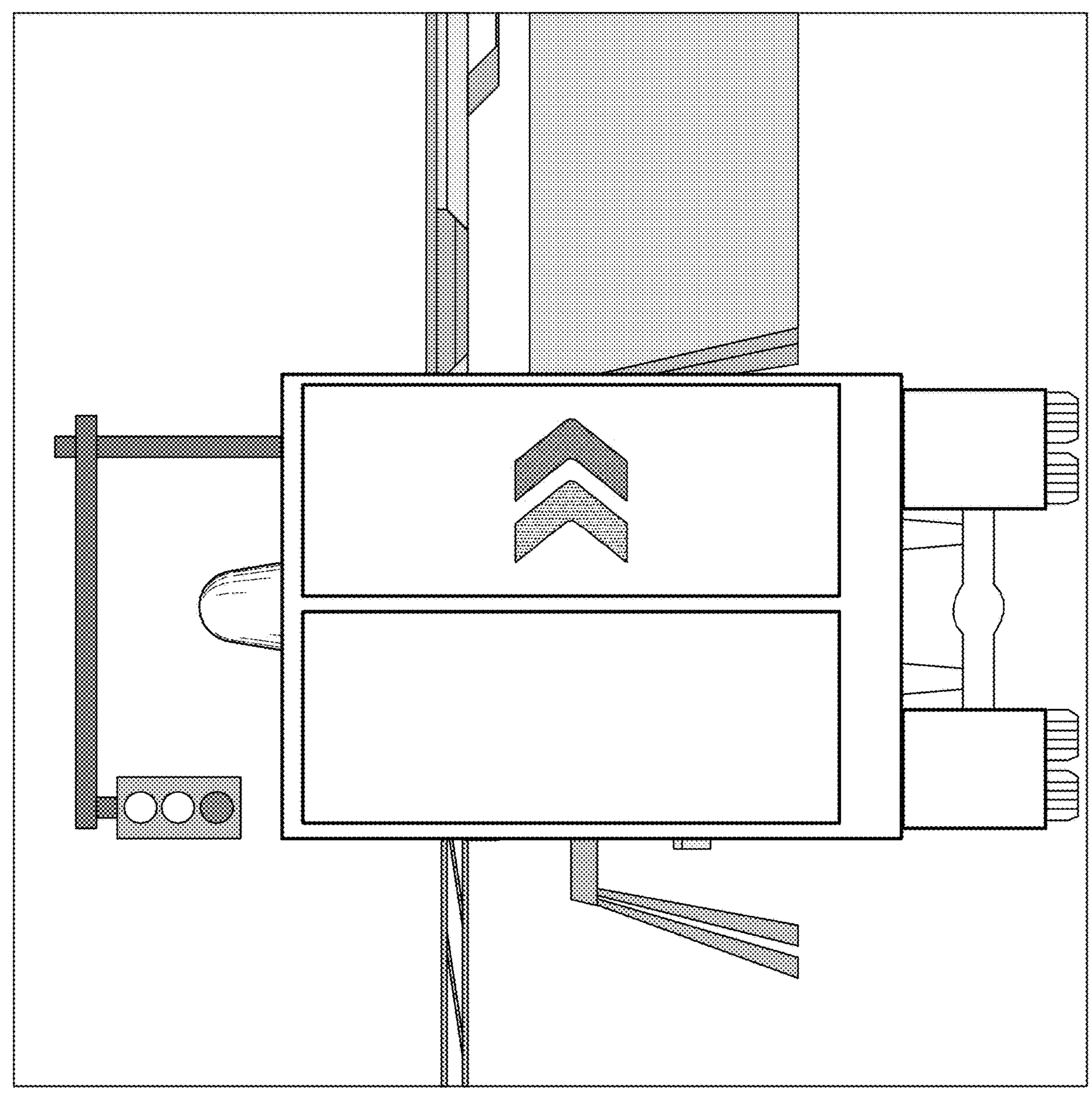
Figure 7C:
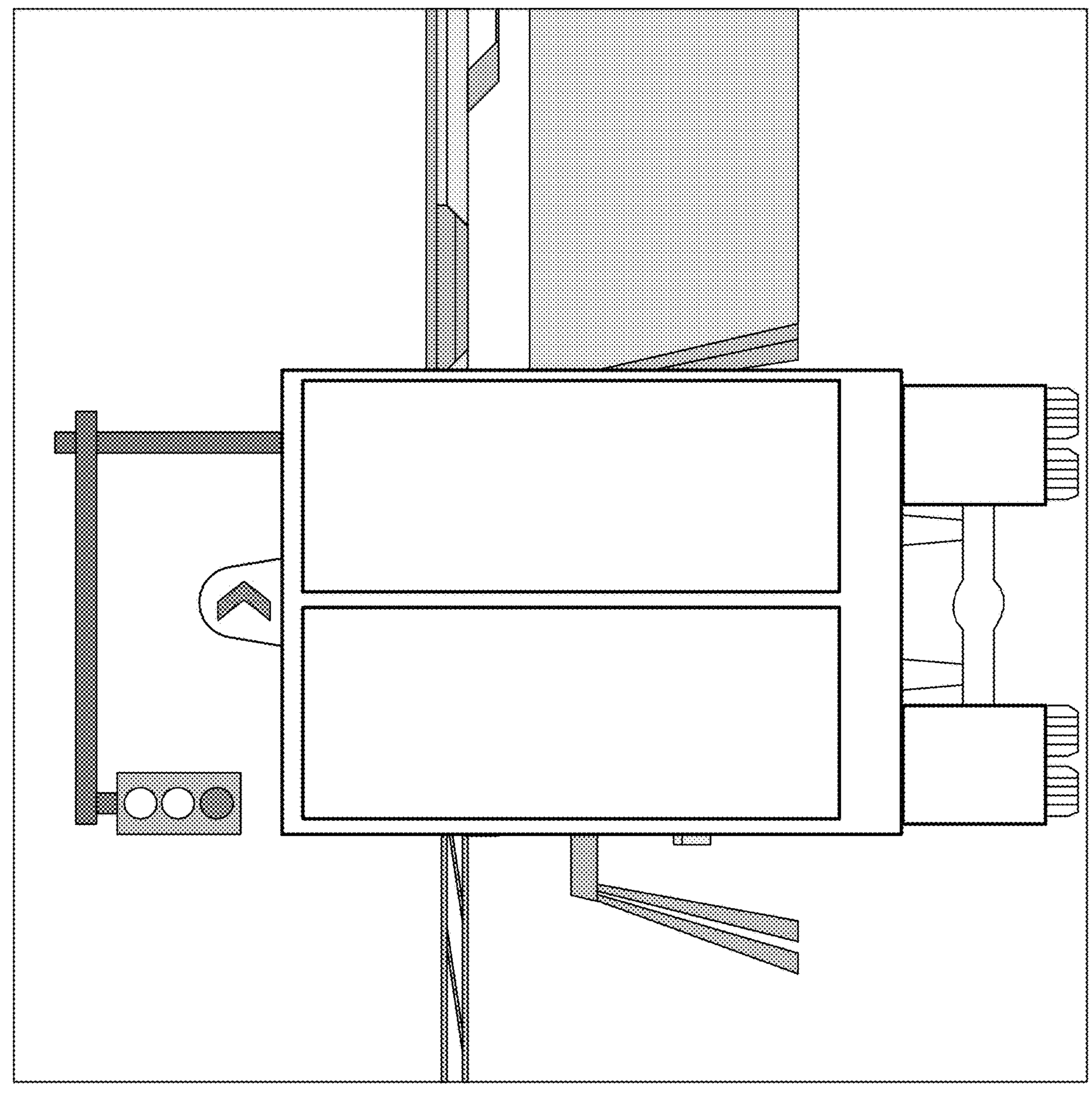
Figure 7D:
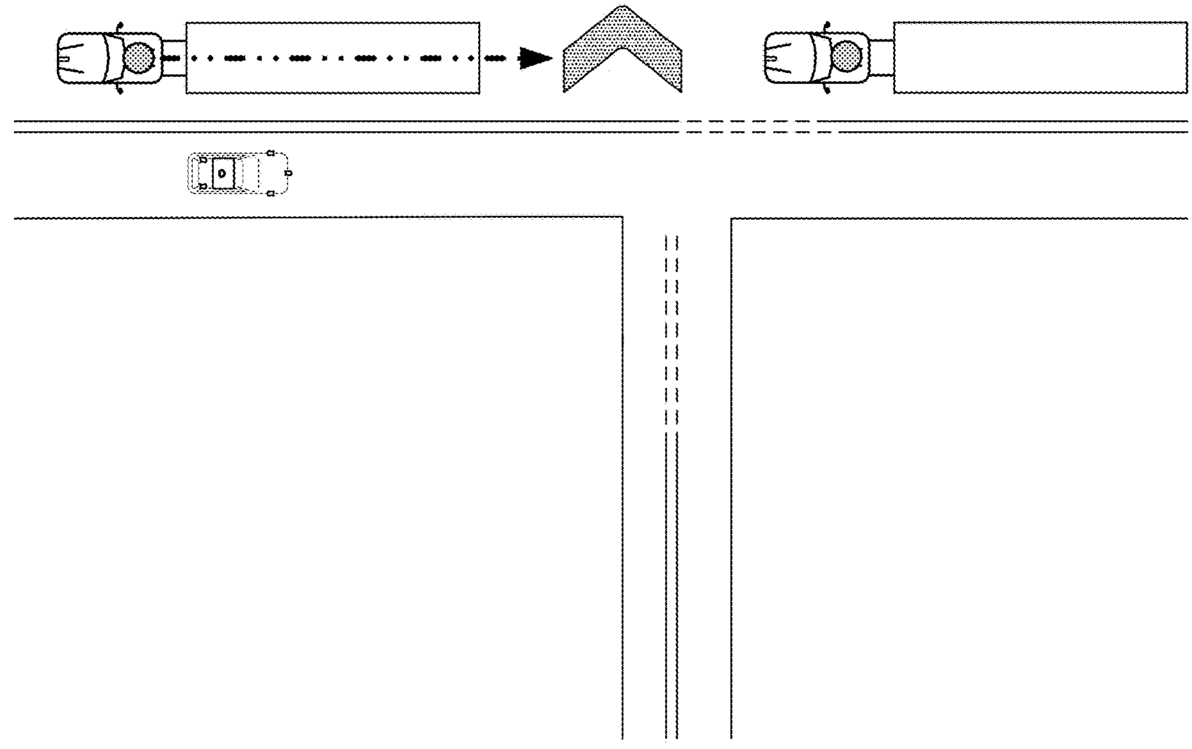

In addition to communicating by passing data directly between the vehicles, the lead vehicle may communicate an upcoming turn or other driving action via visual or other messages. This may include a maneuver for the planned trajectory, such as an indication of braking, or even how hard the lead vehicle will brake. For instance, as shown in FIGS. 7B-D, specific shapes or patterns may be presented. As shown by view 710 of FIG. 7B, one or more directional arrows or other objects may be flashed on a rear door or other portion of the lead vehicle. As shown by view 720 of FIG. 7C, information can be displayed on a sensor housing. And as shown by view 730 of FIG. 7D, the information may be projected onto the roadway surface. In any or all of these cases, the information may be presented visually either optically or via infrared signaling. Each of these may be performed along or in conjunction with one another. Alternatively or optionally, information may also be communicated to other nearby vehicles, bicyclists and pedestrians to indicate the lead-follow relationship or request that other vehicles slow down, etc.

Figure 8A:
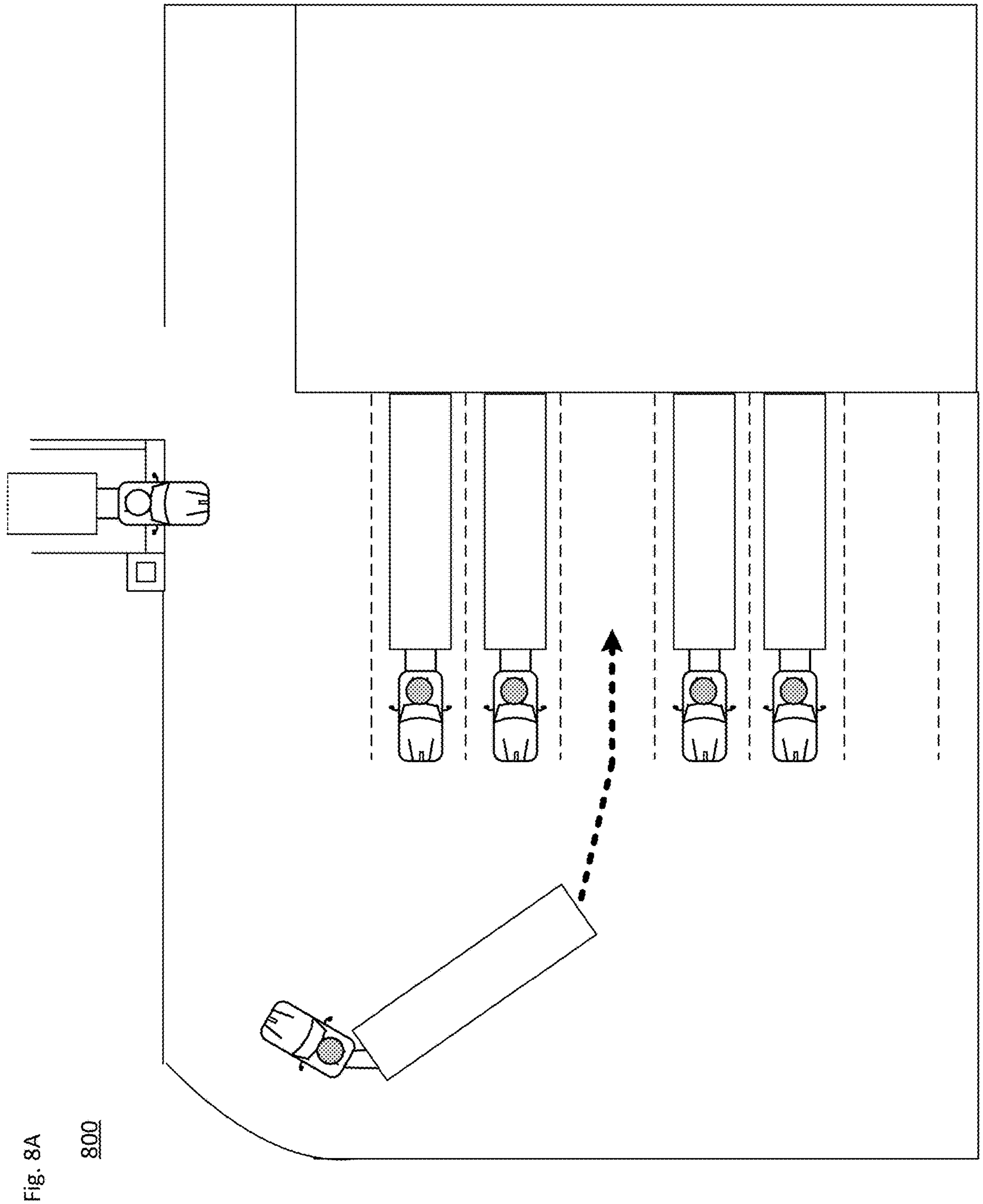
FIGS. 8A-B illustrate exemplary large vehicle parking scenarios in accordance with aspects of the disclosure.
Figure 8B:
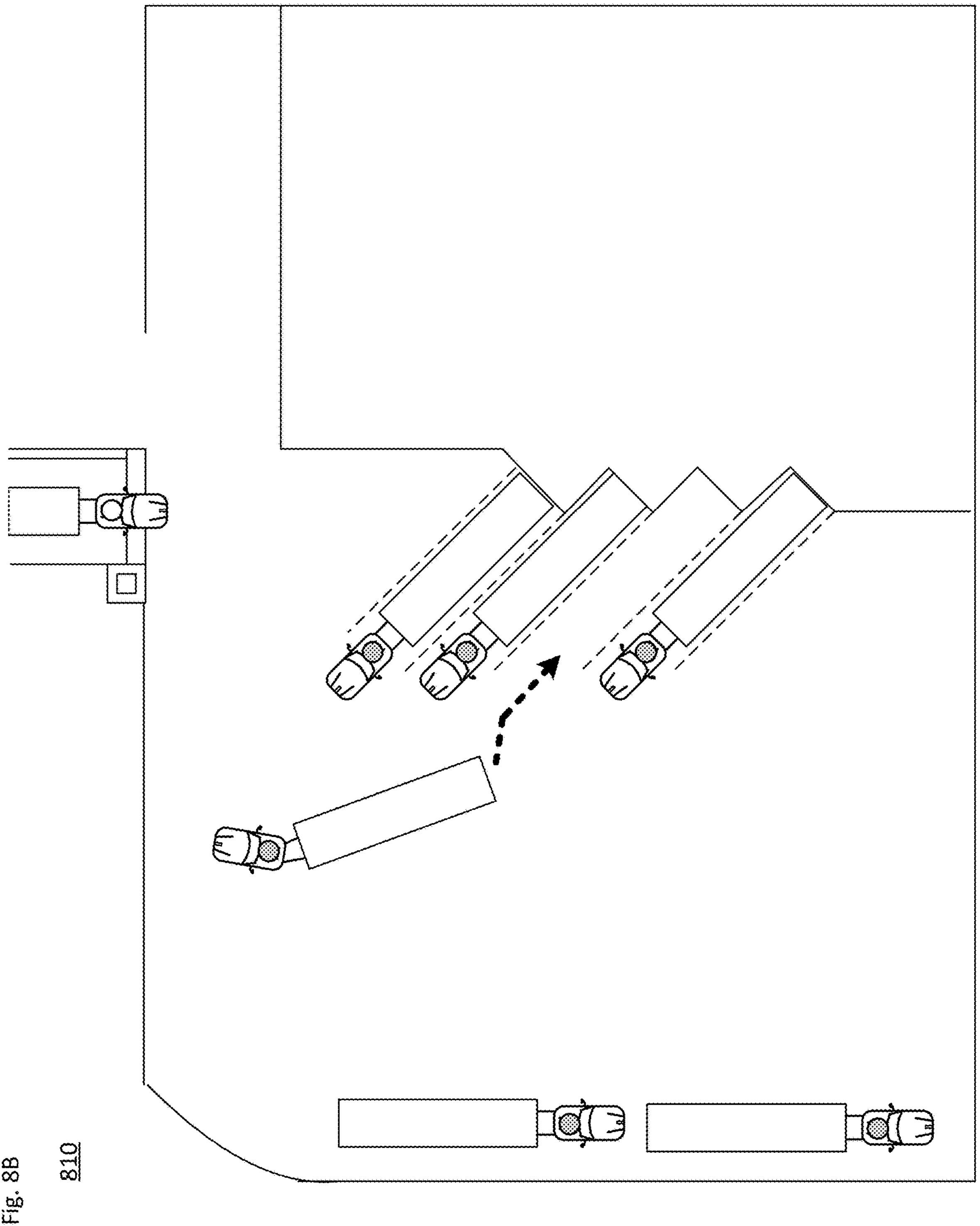

Once the truck has arrived at the depot or other destination, either with or without the assistance of a lead vehicle, it will need to park. FIGS. 8A and 8B illustrate two examples 800 and 810, respectively, showing a truck parking at a loading bay of a warehouse or other depot. The specific parking location (e.g., a dock or loading bay) may be assigned to the truck or the truck may select it based on, e.g., available of spaces, size of the maneuvering area, size of the vehicle, sensor visibility, a detailed map of the depot, and possibly other factors. For instance, during hot temperatures (e.g., in excess of 90-100 degrees), it may be desirable to restrict the amount of time the vehicle spends in the heat or in direct sunlight as this could affect sensor operation. Therefore, the system may select a loading dock that is located in the shade. In addition, the depot or other facility may want to minimize situations where people are walking around in the area where autonomous trucks are located, or vice versa. Thus, docks located near the entrance/exit of the building might be restricted for autonomous trucks based on certain times of day, certain speeds, limitations on types of truck based on sensor fields of view or occlusions at the facility, etc.

Even though a truck may be configured to operate in a fully autonomous mode for general driving purposes, it may not have sensors positioned on the trailer. For instance, the tractor may be able to operate fully autonomously with a legacy trailer that does not include any sensors. However, sensors positioned on or around the cab of the tractor may not have sufficient visibility to permit fully autonomous docking at the depot. Thus, according to one aspect of the technology, a combination of features is employed. This combination uses remote assistance, cameras and/or other sensors at the dock, and highly accurate 3D maps of the depot.

In one scenario, there may be standard "reversing" lanes marked into the roadgraph at the depot that the truck can follow. Here, one or more cameras or other sensors (e.g., lidar, radar and/or sonar sensors) are positioned at the docking area to assist with pulling into a spot. In this case, once the cameras or other sensors detect any moving object in their field of view, the camera system (e.g., a perception system at the depot) will notify the truck to stop and wait until the object has moved away. Object detection can include machine learning algorithms or, optionally, remote assistance can watch the camera feeds of the docking area. A human remote assistant can also instruct the truck to stop until the object has cleared the area.

In addition to this, a remote assistant can draw an augmented trajectory for the truck to follow as it backs into the allotted space. The augmented trajectory and/or road graph would be based on a known map of the dock area, which includes both the dock parking area and a maneuvering area that are within an overall apron space. This information is transmitted to the vehicle, and the planning system or other onboard system can be used to maneuver the truck to the dock's loading platform. In this case, if an obstruction appears in the truck's path, for example due to a pedestrian or forklift traversing the maneuvering area, the remote assistant may revise the augmented trajectory. While this is happening, the truck will stop or reposition itself to avoid the obstruction.

In addition, according to another aspect of the technology, perception algorithms can be run on the images or other data obtained by the depot's cameras or other sensors. The perception algorithms can detect types of objects (e.g., people, forklifts, etc.) and that information may be used when creating the road graph or augmented trajectory. And according to a further aspect, reflective paint or markers (e.g., reflective for detection by optical or infrared cameras or other sensors) may be placed on the ground to help visually guide the truck into the dock.

Figure 9A:
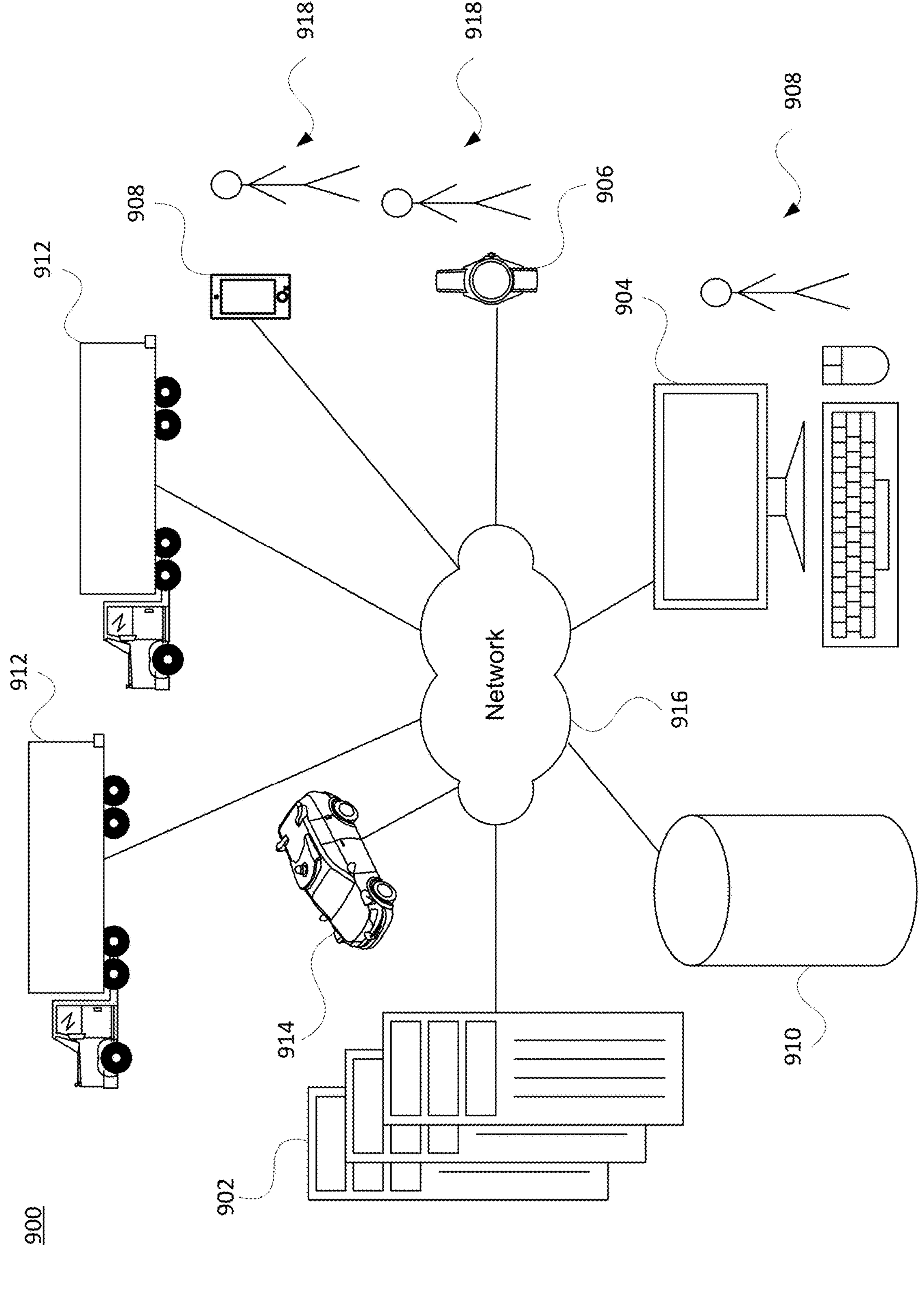

As discussed above, the on-board system of a given vehicle may communicate with another vehicle (lead vehicle or one or more following vehicles), and/or may communicate with a remote system such as remote assistance. One example of this is shown in FIGS. 9A and 9B. In particular, FIGS. 9A and 9B are pictorial and functional diagrams 900 and 950, respectively, of an example system that includes a plurality of computing devices 902, 904, 906, 908 and a storage system 910 connected via a network 916. The system also includes vehicles 912 and 914, which may be configured the same as or similarly to vehicles 100 and 150 of FIGS. 1A-B and 1C. Vehicles 912 and/or vehicles 914 may be part of a fleet of vehicles. By way of example, vehicles 912 are cargo vehicles capable of following a lead vehicle 914 while operating in a semi-autonomous driving mode. Although only a few vehicles and computing devices are depicted for simplicity, a typical system may include significantly more, such as dozens or hundreds.

As shown in FIG. 9B, each of computing devices 902, 904, 906 and 908 may include one or more processors, memory, data and instructions. Such processors, memories, data and instructions may be configured similarly to the ones described above with regard to FIG. 2A.

The various computing devices and vehicles may communication via one or more networks, such as network 916. The network 916, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 902 may include one or more server computing devices having a plurality of computing devices, e.g., a load balanced server farm or cloud-based system, that exchange information with different nodes of a network for the purpose of receiving, processing and transmitting the data to and from other computing devices. For instance, computing device 902 may include one or more server computing devices that are capable of communicating with the computing devices of vehicles 912 and/or 914, as well as computing devices 904, 906 and 908 via the network 916. For example, vehicles 912 and/or 914 may be a part of a fleet of vehicles that can be dispatched by a server computing device to various locations. In this regard, the computing device 902 may function as a dispatching server computing system which can be used to dispatch vehicles to different locations in order to pick up and deliver cargo or provide other services. In addition, server computing device 902 may use network 916 to transmit and present information to the vehicles regarding a lead-follow process, depot parking, ingress or egress, etc. The server computing device 902 may also use network 916 to communicate with a user of one of the other computing devices or a person of a vehicle, such as a driver of a lead vehicle. In this regard, computing devices 904, 906 and 908 may be considered client computing devices.

As shown in FIG. 9A each client computing device 904, 906 and 908 may be a personal computing device intended for use by a respective user 918, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 906 and 908 may be mobile phones or devices such as a wireless-enabled PDA, a tablet PC, a wearable computing device (e.g., a smartwatch), or a netbook that is capable of obtaining information via the Internet or other networks.

In some examples, client computing device 904 may be a remote assistance workstation used by an administrator or operator to communicate with vehicles operating in an autonomous mode, drivers of lead vehicles, or passengers as discussed further below. Although only a single remote assistance workstation 904 is shown in FIGS. 9A-9B, any number of such workstations may be included in a given system. Moreover, although operations workstation is depicted as a desktop-type computer, operations works stations may include various types of personal computing devices such as laptops, netbooks, tablet computers, etc.

Storage system 910 can be of any type of computerized storage capable of storing information accessible by the server computing devices 902, such as a hard-drive, memory card, ROM, RAM, DVD, CD-ROM, flash drive and/or tape drive. In addition, storage system 910 may include a distributed storage system where data is stored on a plurality of different storage devices which may be physically located at the same or different geographic locations. Storage system 910 may be connected to the computing devices via the network 916 as shown in FIGS. 9A-9B, and/or may be directly connected to or incorporated into any of the computing devices.

Storage system 910 may store various types of information. For instance, the storage system 910 may also store autonomous vehicle control software which is to be used by vehicles, such as vehicles 912 or 914, to operate such vehicles in an autonomous driving mode as described above. Storage system 910 may store various types of information as described in more detail below. This information may be retrieved or otherwise accessed by a server computing device, such as one or more server computing devices 902, in order to perform some or all of the features described herein.

For instance, storage system 910 may store real-time state information, received sensor data from one or more vehicles, roadgraph data (e.g., including augmented trajectory information), driving regulation information for different jurisdictions, detailed vehicle models for different vehicles in a fleet, etc.

As discussed above, vehicles may communication with remote assistance in order to initiate lead-follow situations (e.g., including authentication) and to assist with parking a vehicle at a depot, warehouse, etc. For instance, should a cargo vehicle determine that it needs to transition from a fully autonomous mode to a following driving mode, it may send a query and/or data to remote assistance to identify and/or authenticate a lead vehicle. And when arriving at a depot, the cargo vehicle may request a roadgraph of the facility and/or an assigned spot at which to dock.

In a situation where there is a driver or passenger in the vehicle, the vehicle or remote assistance may communicate directly or indirectly with that person's client computing device. Here, for example, information may be provided to the person regarding the current driving mode, actions being taken or to be taken, etc.

Figure 10A:
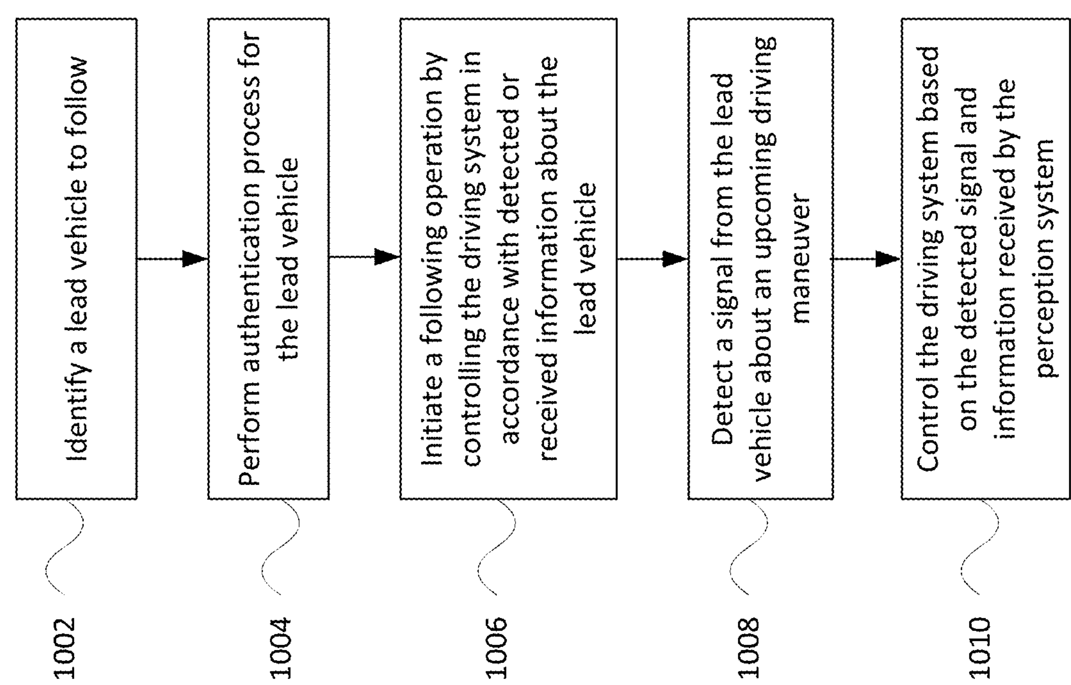
FIG. 10A illustrates a first example lead-follow method in accordance with aspects of the technology.

FIG. 10A illustrates an example 1000 of a method of performing a lead-follow operation. Here, at block 1002 a lead vehicle is identified that the vehicle of interest is able to follow. The identification may be done directly between the lead and follow vehicles, e.g., using visual or RF-based communication at a selected point along the roadway, or via a third party such as a remote assistance service that identifies one or more possible lead vehicles.

At block 1004, an authentication process is performed for the lead vehicle. As noted above, this can be done directly between the two vehicles. Alternatively, a remote system in communication with the cargo vehicle can assist with authentication. By way of example the lead vehicle sends a request to a remote server for the cargo vehicle to enter a "search for leader" mode, in which the remote server sends this information to the cargo vehicle. Alternatively, the remote system may mark a vehicle on the roadway as the lead vehicle. Here, the remote system may cause the cargo vehicle to enter the "follow" mode to follow the lead vehicle.

At block 1006, the following operation (mode) is initiated. For instance, the computer system of the cargo vehicle causes the driving system to perform one or more follow operations in accordance with detected or received information about the lead vehicle. At block 1008, a signal from the lead vehicle is detected, e.g., by one or more sensors of following vehicle's perceptions system or by its perception system. Here, the signal relates to an upcoming driving maneuver that is to be performed by one or both of the lead and/or following vehicles. And at block 1010, the driving system of the following vehicle is controlled based on the detected signal and information received from a perception system of the following (and/or lead) vehicle.

Figure 10B:
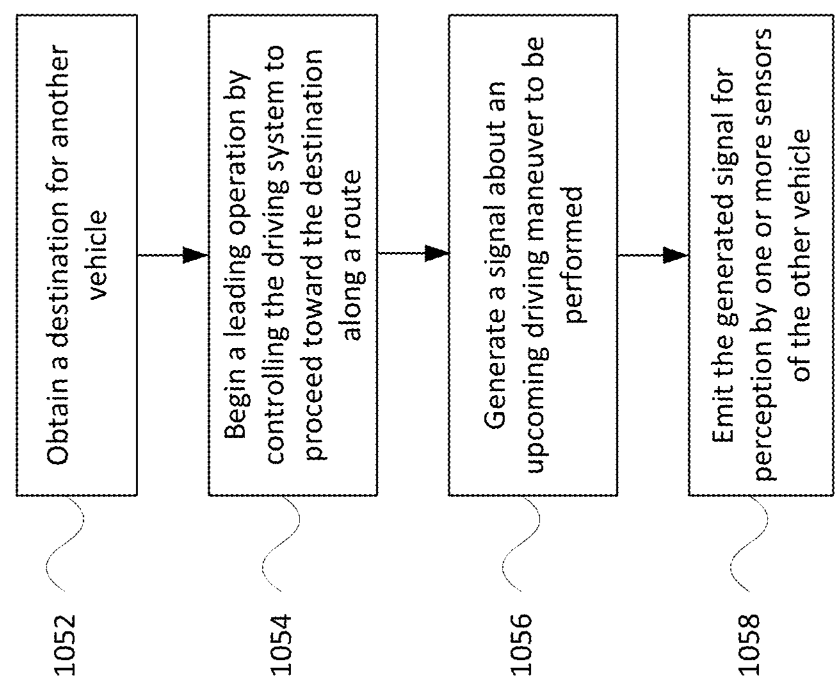
FIG. 10B illustrates a second example lead-follow method in accordance with aspects of the technology.

FIG. 10B illustrates another example 1050 of a method of performing a lead-follow operation. Here, at block 1052 the destination for another vehicle is obtained. This may be done via direct communication between a potential lead vehicle and a following cargo vehicle, or via a third party such as a remote dispatch service that receives destination information from a cargo vehicle and passes it onto one or more potential lead vehicles. At block 1054, the lead vehicle begins a leading operation by controlling the driving system of the lead vehicle to proceed toward the destination along a route. This may be done in a fully or partially autonomous driving mode, or done in response to manual control of the lead vehicle by a human driver.

At block 1056, a signal is generated about an upcoming driving maneuver to be performed. The upcoming driving maneuver may be for the following vehicle, an action to be taken by the lead vehicle, or both. Upon generation, at block 1058 the signal is emitted for perception by one or more sensors of the following vehicle. As noted above, the signal may be communicated directly between the lead and following vehicles via optical or RF communication. The amount of information passed by the signal may vary depending on the type of following and/or lead vehicles, network access or bandwidth availability, etc.

Figure 11:
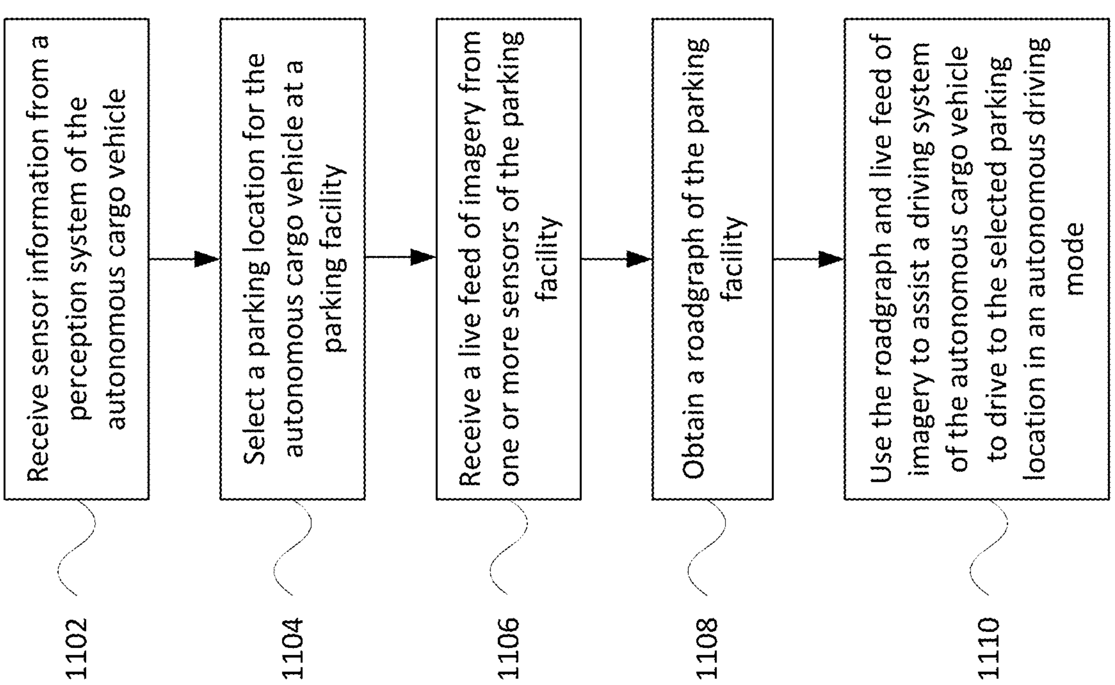
FIG. 11 illustrates an example parking assistance method in accordance with aspects of the technology.

FIG. 11 illustrates an example 1100 of a method of assisting parking a vehicle, such as an autonomous cargo vehicle, at a depot or other destination (e.g., parking facility). At block 1102, sensor information is received from a perception system of the autonomous cargo vehicle, for instance as it pulls into a loading dock area. At block 1104, the system selects a parking location for the autonomous cargo vehicle at a parking facility. The selection may be based on one or more factors, including number of available loading bays, vehicle size, type of cargo, volume of traffic at the facility, etc.

At block 1106, the system receives a live feed of imagery from one or more sensors of the parking facility. This can include optical and/or infrared cameras, lidar, radar or other sensors. At block 1108, the system obtains a roadgraph of the parking facility. The roadgraph provides a path for the autonomous cargo vehicle to arrive at the selected parking location. And at block 1110, the system uses the roadgraph and live feed of imagery to assist a driving system of the autonomous cargo vehicle to drive to the selected parking location in an autonomous driving mode.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. An autonomous vehicle, comprising:

a perception system including one or more sensors disposed along corresponding exterior surfaces of the autonomous vehicle; and one or more computing devices including a memory configured to store map information usable to navigate the autonomous vehicle, the one or more computing devices being configured to:

generate a first trajectory to a parking location of a parking facility using the map information and sensor information obtained from the one or more sensors of the perception system;

modify the first trajectory to obtain a modified trajectory to the parking location of the parking facility, based on sensor data obtained from one or more sensors of the parking facility; and control, using the modified trajectory, a driving system of the autonomous vehicle to drive to the parking location in an autonomous driving mode.

2. The autonomous vehicle of claim 1, wherein the autonomous vehicle is an autonomous cargo vehicle, and the one or more sensors of the perception system are disposed along a cab of the autonomous cargo vehicle and are not disposed on a trailer of the autonomous cargo vehicle.

3. The autonomous vehicle of claim 1, wherein at least one of the first trajectory and the modified trajectory includes a reversing maneuver to back the autonomous vehicle into the parking location.

4. The autonomous vehicle of claim 1, wherein the sensor data is real time sensor data obtained from the one or more sensors of the parking facility.

5. The autonomous vehicle of claim 1, wherein the one or more computing devices are further configured to provide the modified trajectory to the driving system to enable the driving system to drive to the parking location in the autonomous driving mode.

6. The autonomous vehicle of claim 1, wherein the modification of the first trajectory is further based on a roadgraph of the parking facility, the roadgraph including a set of paths for backing the autonomous vehicle into the parking location.

7. The autonomous vehicle of claim 1, wherein the parking location is assigned to the autonomous vehicle by the parking facility based on at least one of:

ambient temperature at the parking facility;

whether the parking location is locating in direct sunlight or in shade; or an evaluation of at least one of a time of day, position of the parking location relative to an entrance or exit of the parking facility, a speed limit at the parking facility, or a vehicle type.

8. The autonomous vehicle of claim 1, wherein the one or more computing devices are further configured to select the parking location.

9. The autonomous vehicle of claim 8, wherein selection of the parking location is based on at least one of an availability of parking spaces, a size of a maneuvering area at the parking facility, a size of the autonomous vehicle, sensor visibility of the perception system of the autonomous vehicle, or a detailed map of the parking facility.

10. The autonomous vehicle of claim 1, wherein the one or more computing devices are further configured to:

identify an obstruction at the parking facility between the autonomous vehicle and the parking location; and modify either the first trajectory or the modified trajectory to avoid the obstruction.

11. The autonomous vehicle of claim 1, wherein the modified trajectory is further based on a perception analysis of the sensor data to detect one or more objects in the parking facility.

12. A method comprising:

generating, by one or more computing devices of an autonomous vehicle, a first trajectory to a parking location of a parking facility using map information and sensor information pertaining to an external environment of the autonomous vehicle;

modifying, by the one or more computing devices of the autonomous vehicle, the first trajectory to obtain a modified trajectory to the parking location of the parking facility, based on sensor data obtained from one or more sensors of the parking facility; and controlling, using the modified trajectory, a driving system of the autonomous vehicle to drive to the parking location in an autonomous driving mode.

13. The method of claim 12, wherein the autonomous vehicle is an autonomous cargo vehicle, and the sensor information pertaining to the external environment of the autonomous cargo vehicle is received from one or more sensors of a perception system of the autonomous cargo vehicle disposed along a cab thereof.

14. The method of claim 12, wherein at least one of the first trajectory and the modified trajectory includes a reversing maneuver to back the autonomous vehicle into the parking location.

15. The method of claim 12, wherein the sensor data is real time sensor data obtained from the one or more sensors of the parking facility.

16. The method of claim 12, further comprising providing the modified trajectory to the driving system to enable the driving system to drive to the parking location in the autonomous driving mode.

17. The method of claim 12, wherein the modified trajectory to the parking location is further based on a roadgraph of the parking facility, the roadgraph including a set of paths for backing the autonomous vehicle into the parking location.

18. The method of claim 12, further comprising:

detecting an obstruction at the parking facility between the autonomous vehicle and the parking location; and modifying either the first trajectory or the modified trajectory to avoid the obstruction.

19. The method of claim 12, wherein the modified trajectory is further based on a perception analysis of the sensor data to detect one or more objects in the parking facility and wherein the perception analysis includes categorizing the detected one or more objects.

20. The method of claim 19, the method further comprising instructing the driving system of the autonomous vehicle to take a corrective action in response to categorization of at least one of the detected one or more objects.

* * * * *